United States Patent
Dong

(10) Patent No.: US 12,326,226 B2
(45) Date of Patent: *Jun. 10, 2025

(54) SMART VEHICLE LIGHTING DEVICE

(71) Applicant: Xin Dong, Bastrop, TX (US)

(72) Inventor: Xin Dong, Bastrop, TX (US)

(73) Assignee: Xin Dong, Bastrop, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,171

(22) Filed: Nov. 6, 2023

(65) Prior Publication Data

US 2024/0110679 A1    Apr. 4, 2024

Related U.S. Application Data

(63) Continuation of application No. 17/969,637, filed on Oct. 19, 2022, now Pat. No. 11,808,422.

(60) Provisional application No. 63/289,028, filed on Dec. 13, 2021.

(51) Int. Cl.
*F21S 41/153* (2018.01)
*F21S 41/143* (2018.01)
*F21S 41/19* (2018.01)
*F21S 41/25* (2018.01)
*F21S 41/32* (2018.01)

(52) U.S. Cl.
CPC .......... *F21S 41/153* (2018.01); *F21S 41/143* (2018.01); *F21S 41/19* (2018.01); *F21S 41/25* (2018.01); *F21S 41/321* (2018.01)

(58) Field of Classification Search
CPC ........ F21S 41/153; F21S 41/143; F21S 41/19; F21S 41/25; F21S 41/321
See application file for complete search history.

(56) References Cited

FOREIGN PATENT DOCUMENTS

EP           2772682 B1 *  9/2020  ........... B60Q 1/0041

\* cited by examiner

*Primary Examiner* — Elmito Breval
(74) *Attorney, Agent, or Firm* — NZ Carr Law Office

(57) ABSTRACT

Embodiments of the present disclosure relate to a vehicle head lamp with customized and/or variable lighting patterns. The vehicle lamp assembly may include an optical assembly, a first LED light source positioned to project light beams to the optical assembly a second LED light source positioned to project light beams to the optical assembly, and a control circuit configured to selectively operating the first LED light source and the second light source.

18 Claims, 20 Drawing Sheets

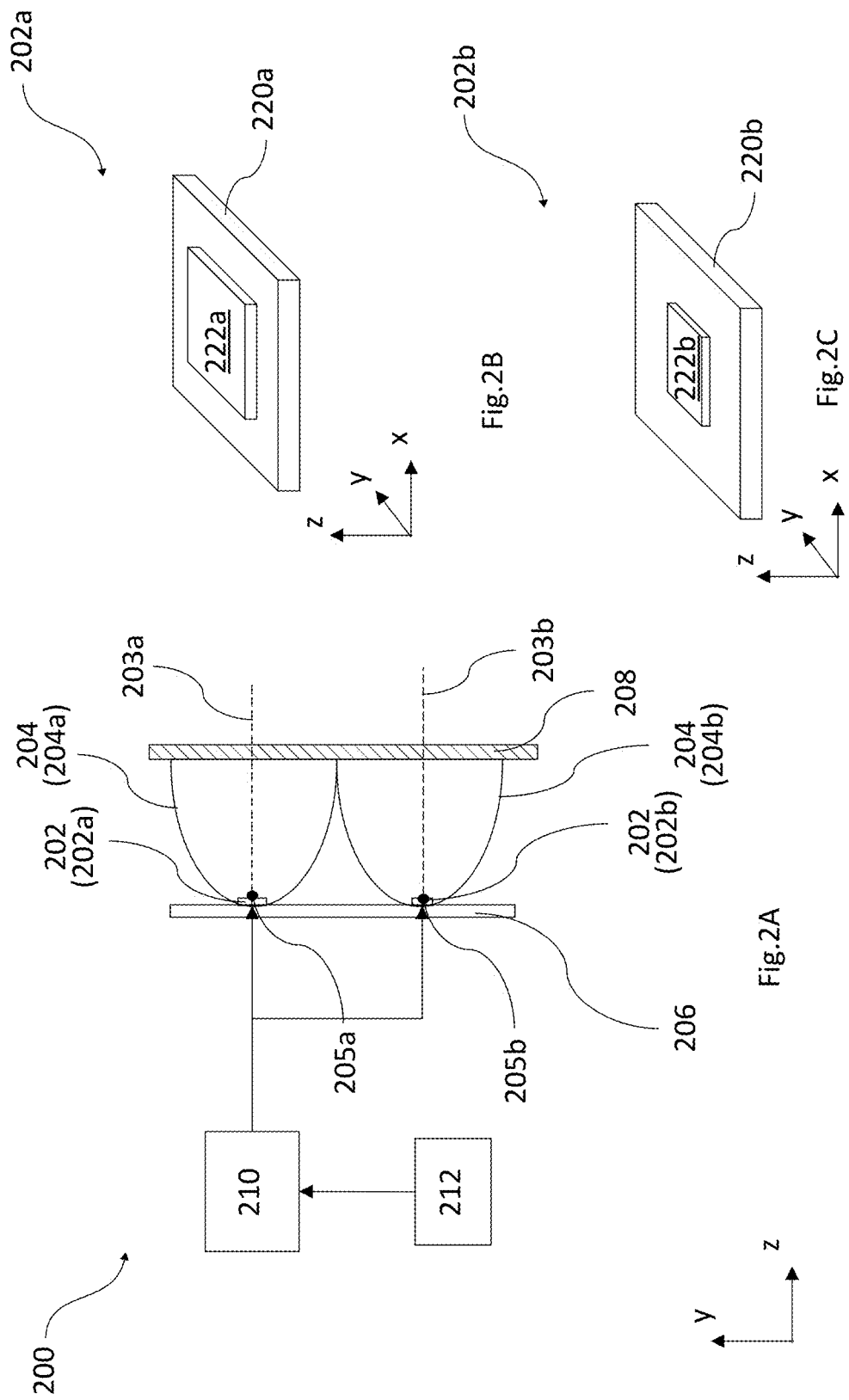

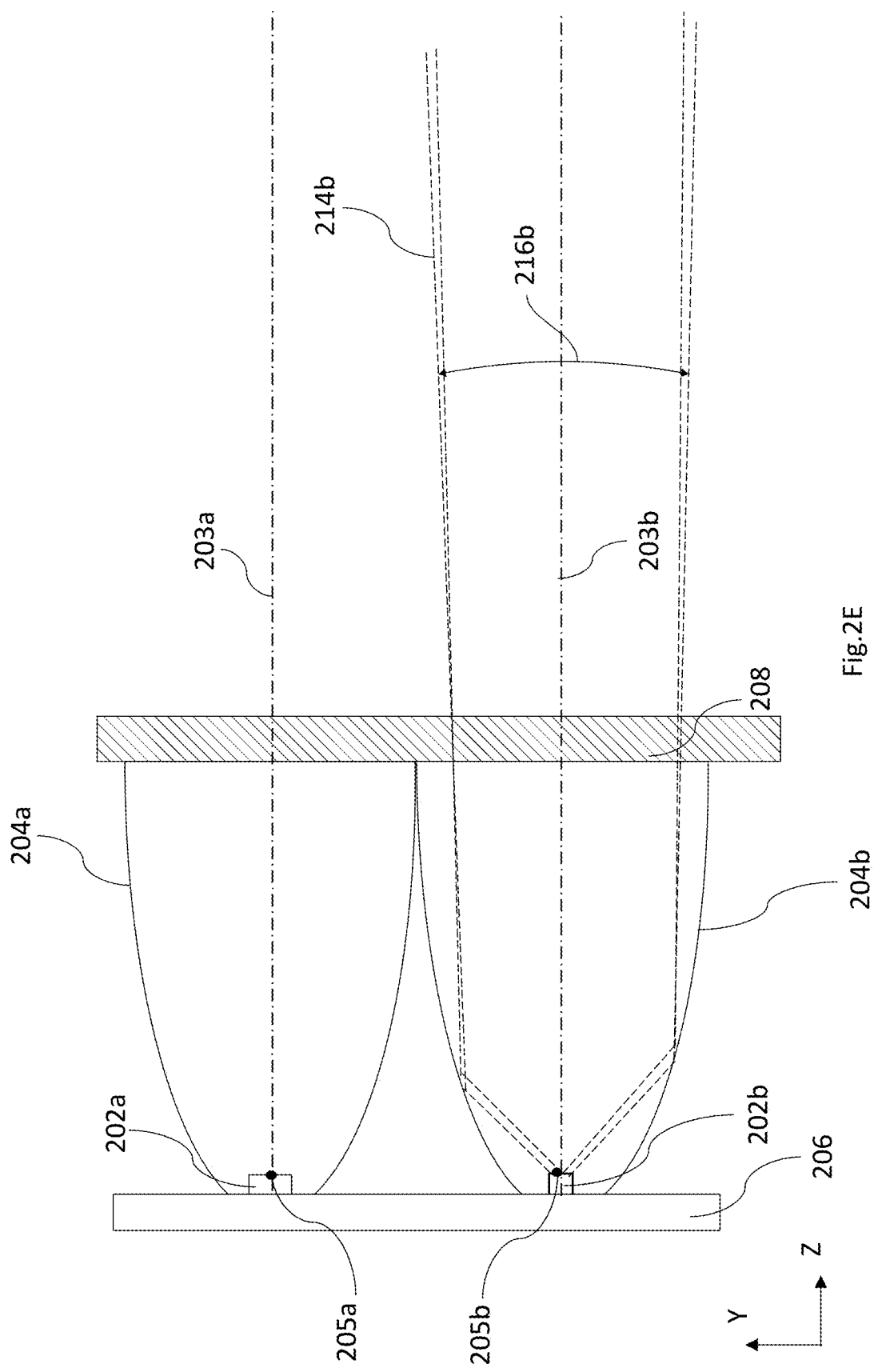

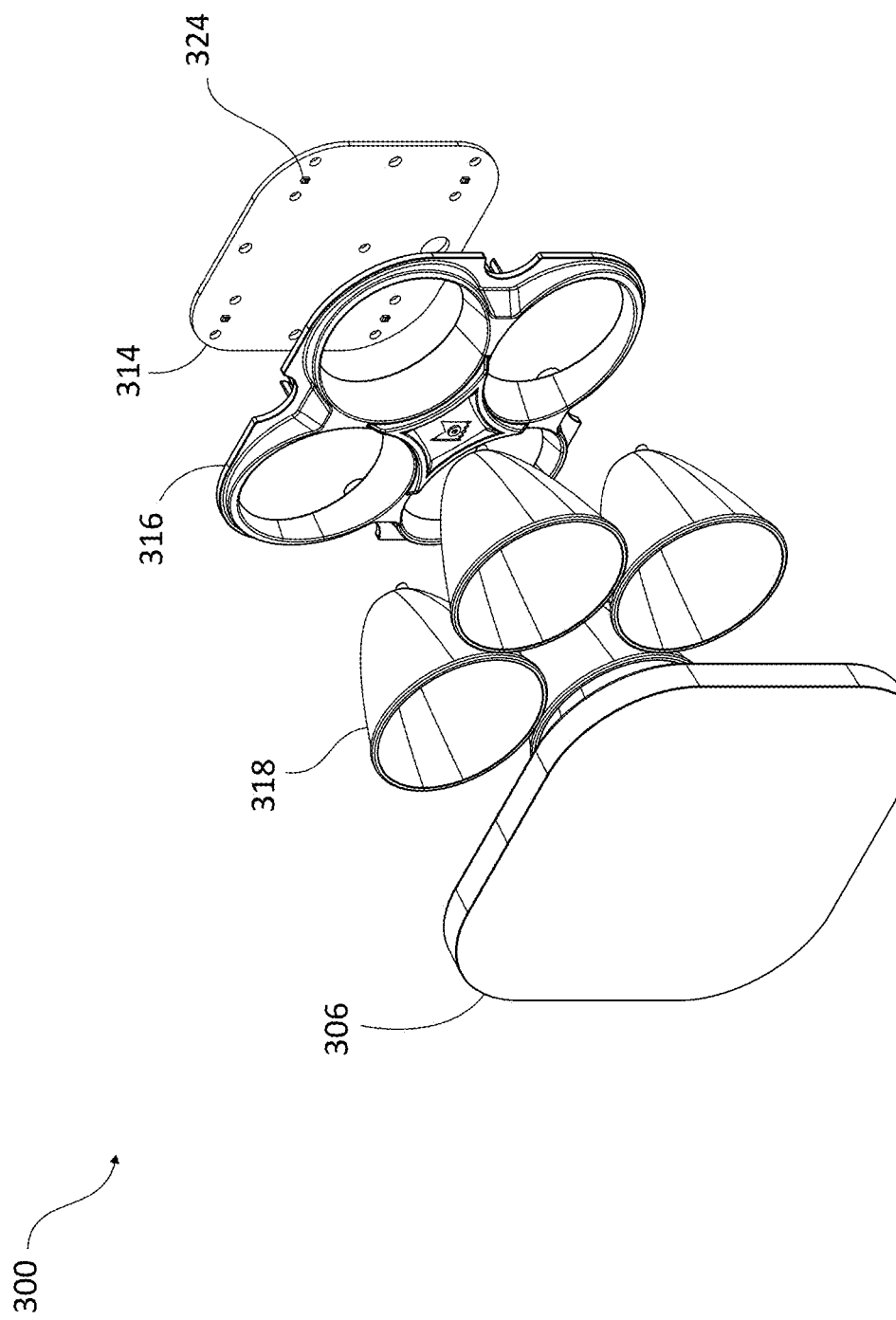

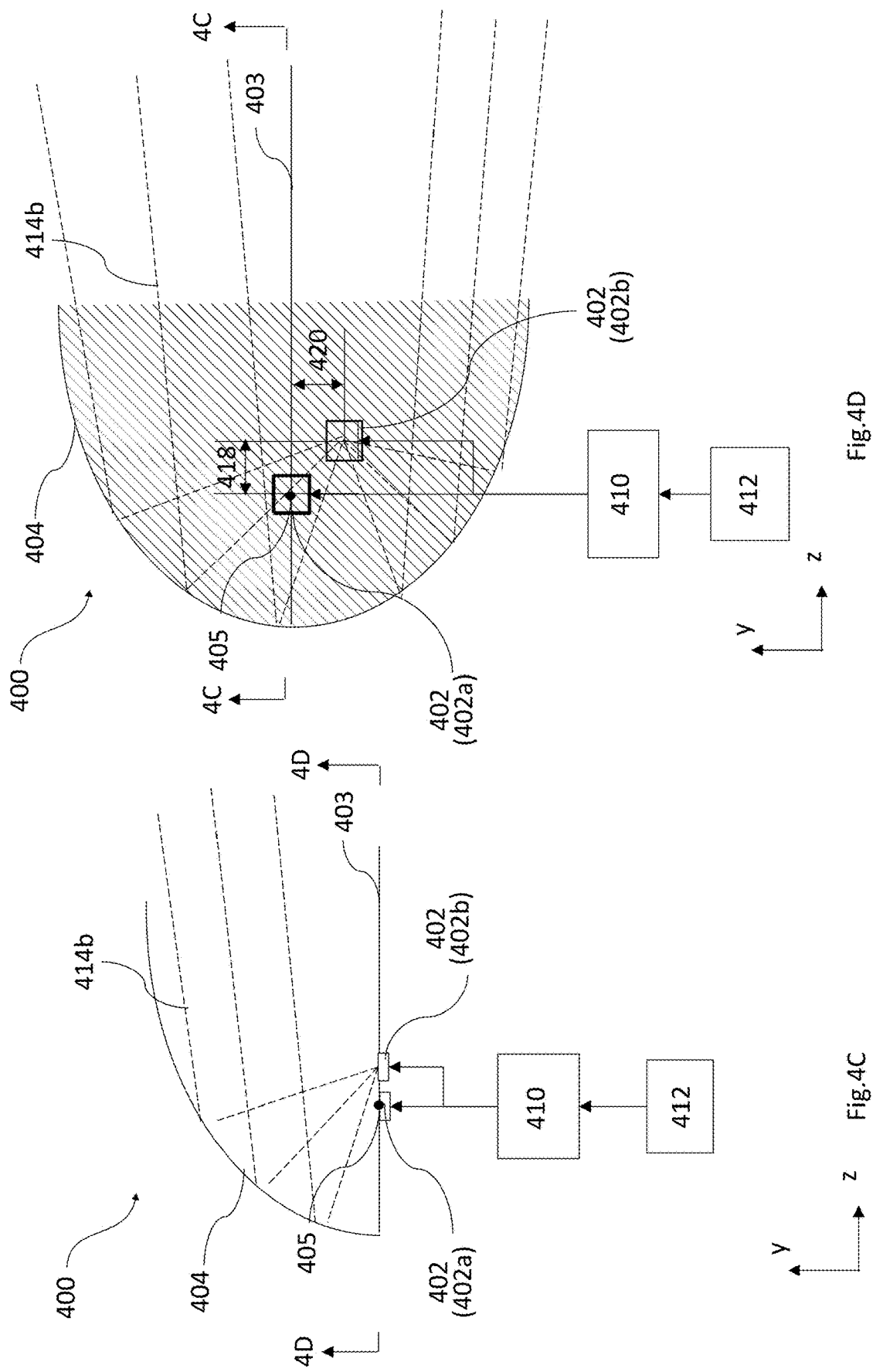

SMART VEHICLE LIGHTING DEVICE

CROSS REFERENCE TO RELATED APPLICATIONS

The present application is a continuation of a pending U.S. patent application Ser. No. 17/969,637, filed on Oct. 19, 2022, which claims priority to U.S. Provisional Patent Application Ser. No. 63/289,028, filed on Dec. 13, 2021. Each of the aforementioned patent application is incorporated hereby as reference in its entirety.

FIELD

The present disclosure relates to vehicle lighting device. Particularly, embodiments of the present disclosure relate to vehicle lamps with variable light distribution patterns.

BACKGROUND

Motor vehicles contain numerous lighting devices for both interior and exterior illumination. For example, exterior vehicle lighting devices may perform stop lamp functions, tail lamp functions, headlamp functions, daytime running light functions, dynamic bending light functions, and fog lamp functions. Typically, there are various standards and requirements by government or insurance agencies to regulate these functions for safety reasons. To meet these standards and requirements, a vehicle typically uses multiple single-function lighting devices, each designated to perform a single function, resulting in a variety of vehicle lamps in each vehicle. It is desirable to use dual-functional or multi-functional lighting devices in a vehicle to reduce weight and/or improve aesthetics. Various technologies have been used to render a lighting device dual-functional or multi-functional. However, the state-of-art technologies involve are expensive and complex because complex optical and/or mechanical structures to generate different lighting patterns suitable for different functions.

Therefore, there is a need for vehicle lighting device with variable lighting patterns at low cost.

SUMMARY

The present disclosure includes vehicle lighting devices, and methods for manufacturing and operating thereof. Particularly, embodiments of the present disclosure provide vehicle lighting device with customized and/or variable lighting patterns.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. It is to be noted, however, that the appended drawings illustrate only typical embodiments of this disclosure and are therefore not to be considered limiting of its scope, for the disclosure may admit to other equally effective embodiments.

FIGS. 2A-2E are various schematic views of a vehicle lighting device according one embodiment of the present disclosure.

FIGS. 3A-3D are schematic views of a vehicle lighting device according one embodiment of the present disclosure.

FIGS. 4A-4D are various schematic views of a vehicle lighting device according to another embodiment of the present disclosure.

Figure 1A:
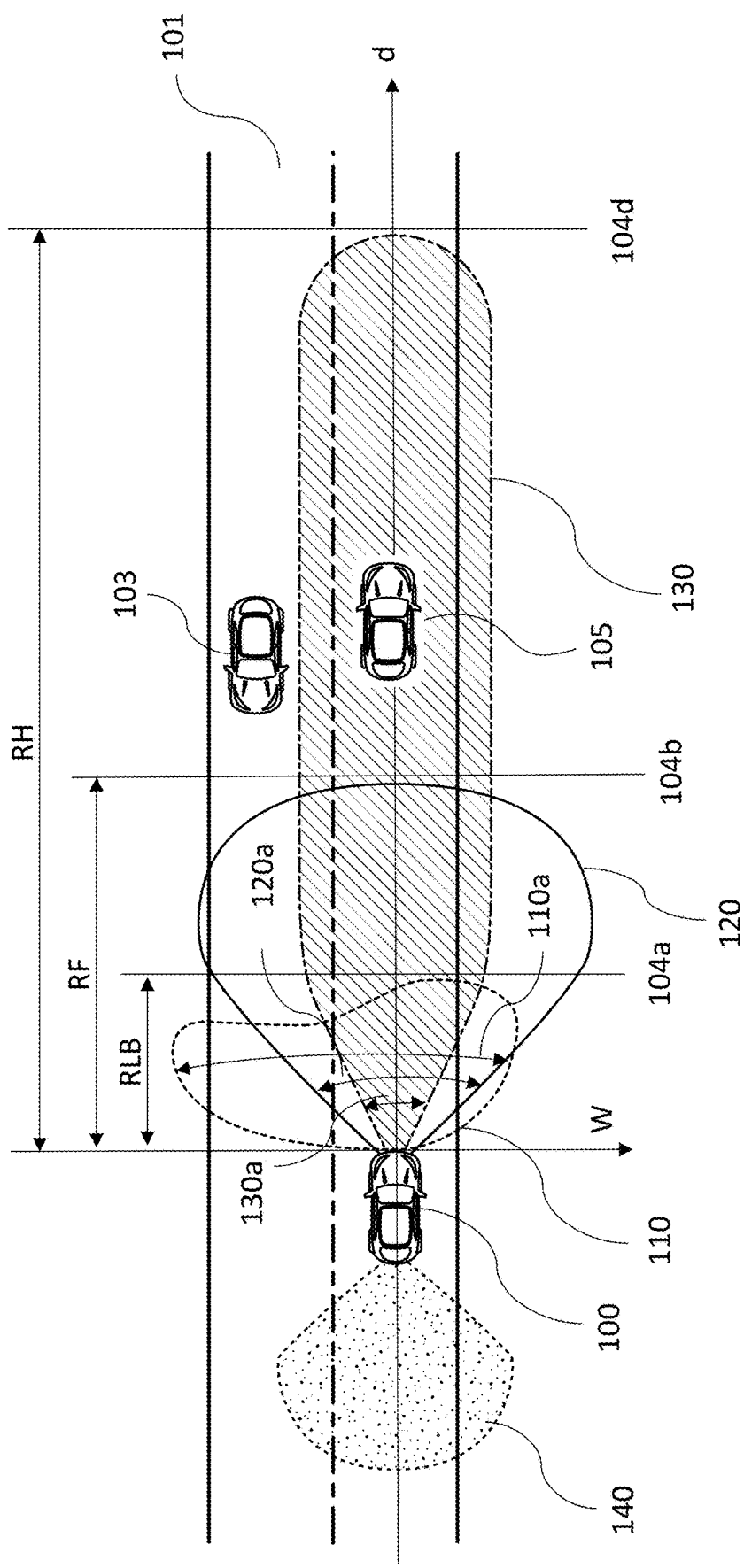
FIG. 1A is a schematic plan view of lighting patterns of various light functions for a vehicle.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present disclosure relate to a vehicle head lamp with customized and/or variable lighting patterns.

Figure 1C:
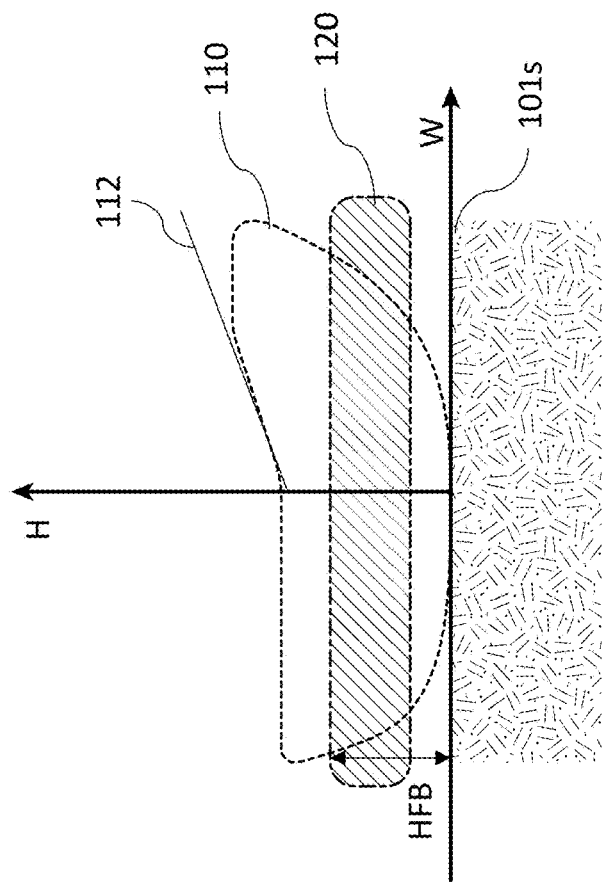
FIGS. 1B and 1C are schematic views of forward driving beam patterns.
Figure 1B:
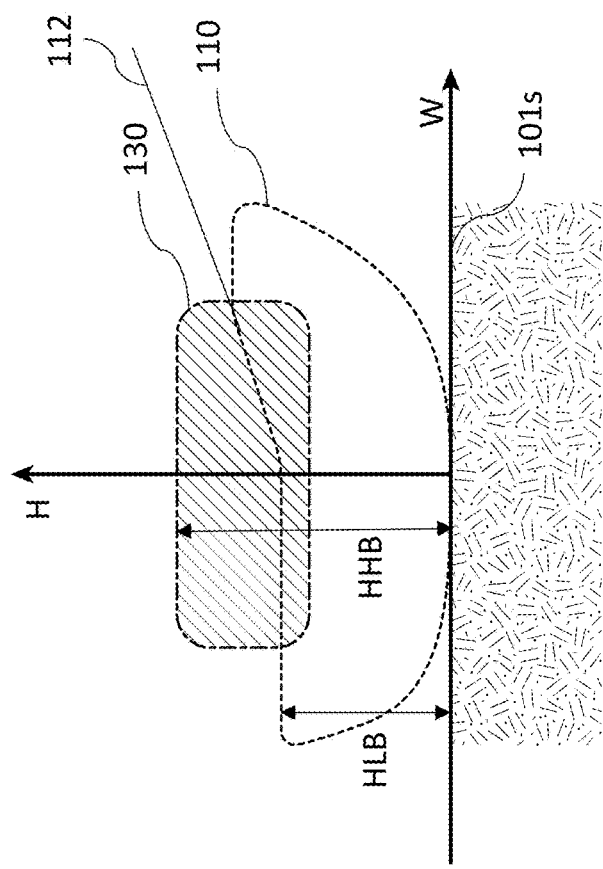

FIG. 1A is a schematic plan view of lighting patterns of various light functions for a vehicle 100. FIGS. 1B and 1C are schematic profiles of forward driving beam patterns in a plane at a target distance. Most states, countries, or regions which utilize motor vehicles have various requirements and standards that a vehicle must meet to be legally use roadways. For example, in the United States, Federal Motor Vehicle Safety Standard (FMVSS) specifies various maximum and minimum photometric intensity values (based on angle) for headlamps. Several vehicle lighting patterns 110, 120, 130, 140 are schematically illustrated in FIGS. 1A-1C. The lighting patterns 110, 120, 130, 140 are regulated by government standards. The lighting patterns 110, 120, 130 are forward driving patterns from vehicle headlamps. The lighting pattern 140 is a backup driving pattern. The lighting pattern 110 is a low beam driving pattern, which requires a light intensity distribution up to a distance 104a, a wide angle 110a, and an uneven bright-dark line 112. The lighting pattern 120 schematically illustrates the fog lighting pattern, which requires a light intensity distribution up to a distance 104b, a relatively wide angle 120a, and a low and symmetrical distribution. The lighting pattern 130 schematically illustrates the high beam drive pattern, which has a light intensity distribution at a distance 104c, a narrow angle 130a, and a high and symmetrical distribution. The lighting pattern 140 schematically illustrates the lighting pattern for backward driving. As shown in FIGS. 1A-1C, the lighting patterns 110, 120, 130, 140 have different light beam shapes, target lighting distances, and light intensity distributions. A vehicle includes multiple types of headlamps, each configured to generate a particular lighting pattern corresponding to a corresponding required function.

FIG. 1B includes cross sectional views of low beam pattern 110 and high beam pattern 130. FIG. 1C includes cross sectional views of low beam pattern 110 and high beam pattern 130. The low beam pattern 110 and the high beam pattern 130 are standard forward driving beam patterns by a vehicle headlamp.

The low beam pattern 110 is typically regulated by government standards so that the light from the low beam pattern 110 is focused on the proper position and does not create glare or a safety hazard for oncoming traffic. For example, the low beam pattern 110 illuminates the road 100 and surroundings ahead of the vehicle 100 when meeting or closely following other vehicles, such as an incoming vehicle 103 in a left-side lane on the road 101 and a preceding vehicle 105 in the right-side lane. Most standards require that the low beam pattern 110 projects an asymmetrical pattern to provide adequate forward and lateral illumination and control glare by limiting light directed towards preceding or oncoming drivers. As demonstrated in FIGS. 1A-1B, the low beam pattern 110 has an irradiation distance RLB along right lane on the road 101 along which the vehicle 100 is moving. The irradiation distance RLB in a range between about 25 m and 40 m. The irradiation distance RLB along the right line may be referred to as a low beam irradiation distance. However, the low beam pattern 110 has a shorter range in the left-hand lane where the incoming traffic is coming. Thus, the low beam pattern has an asymmetric cutoff along the low-beam bright dark line 112 at a top of the contour of the low beam pattern 110. From the driver's point of view, also illustrated in FIGS. 1B, the low beam bright-dark line 112 is lower on the left side and higher on the right side. The lower portion of the low beam bright-dark line 112 is at a beam height HLB from a road surface 101s. A low beam pattern, such as the low beam pattern 110, is achieved by a low beam light source of certain luminous flux, and a low beam optic assembly. A low beam optic assembly may include reflectors, lens, and a combination thereof to disperse light beam from the low beam light source vertically and laterally to produce the low beam pattern.

The high beam pattern 130 is also a beam pattern for a vehicle headlamp. The high beam pattern 130 is marked by outer boundaries where beams from a high beam headlamp maintains a pre-defined luminous intensity. In FIG. 1B, a contour of the high beam pattern 130 schematically demonstrates illumination range of the high beam pattern 130 in a plan view in front the vehicle 100. The high beam pattern 130 is intended primarily for distance illumination and for use when not meeting or closely following other vehicles. The high beam pattern 130 has center-weighted light distribution without any control over light directed toward any other highway user. The high beam pattern 130 has symmetrical illumination height HHB higher than the illumination height HLB of the low beam pattern 110, as shown in FIG. 1B. A high beam pattern, such as the high beam pattern 130, may be achieved by a high beam light source of certain luminous flux, and an optic assembly, such as lenses, reflectors, or a combination thereof. The high beam pattern 130 has an irradiation distance RH in a range between about 40 m and 100 m. To reach a greater irradiation distance RH, the high beam light source is significantly brighter than the low beam light source. The optic assembly for the high beam pattern is also aimed to focus and project the lights from the high beam light source at a higher angel and to a longer distance.

The fog beam pattern 120 is also a beam pattern for a vehicle headlamp. The fog beam pattern 120 is marked by outer boundaries where beams from a headlamp maintains a pre-defined luminous intensity. In FIGS. 1A and 1C, a contour of the fog beam pattern 120 schematically demonstrates illumination range of the fog beam pattern 120 in a plan view in front the vehicle 100. The fog beam pattern 120 is intended primarily for a scattered light at a close distance with wide and low distribution to illuminate the close distance when fog is present. The fog beam pattern 120 has scattered light distribution without over light directed toward any other highway user. The fog beam pattern 120 has symmetrical illumination height HFB lower than the illumination height HLB of the low beam pattern 110, as shown in FIG. 1C. A fog beam pattern, such as the fog beam pattern 120, may be achieved by a suitable beam light source of certain luminous flux, and an optic assembly, such as lenses, reflectors, or a combination thereof. The fog beam pattern 120 has an irradiation distance RF in a range between about 25 m and 60 m. The optic assembly for the fog beam pattern 120 is also aimed to scatter and project the lights from the fog beam light source.

Embodiments of the present disclosure provide a vehicle lighting device capable of generating two or more different illuminating lighting patterns. In additional to illuminating lights, such as headlamps, a vehicle also includes various signal lights. In some embodiments, a vehicle lighting device may function as both illuminating light and signal light. Various embodiments of lighting devices are described in the figures below.

FIG. 2A is a schematic sectional view of a vehicle lighting device 200 according one embodiment of the present disclosure. The vehicle lighting device 200 may include a light source assembly 202 and an optical assembly 204 configured to project light beams from the light source assembly 202 to two or more illumination patterns. In one embodiment, the light source assembly 202 includes a first light source 202a, and a second light source 202b. The optical assembly 204 includes a first optical structure 204a and a second optical structure 204. The first optical structure 204a is positioned to project a light beam from the first optical source 202a. The second optical structure 204b is positioned to project a light beam from the second optical source 202b. optical assembly 204 may be combination of lens and reflector.

In some embodiments, the optical assembly 204 is fixedly positioned relative to the light source assembly 202. For example, the first optical structure 204a is fixedly positioned relative to the light source 202a. The second optical structure 202b is fixedly positioned relative to the second light source 202b. In some embodiments, the vehicle lighting device 200 may include a frame 206. The light source assembly 202 and the optical assembly 204 are attached to the frame 206. In some embodiments, the vehicle lighting device 200 may include a cover 208 disposed over the optical assembly 204 to protect the light source assembly 202 and the optical assembly 204 from the external environment, such as from dust and moisture. In other embodiments, the cover 208 may be a projector lens configured to adjust lighting pattern, for example, expansion, reduction, and focusing.

The first and second optical structures 204a, 204b may have an optical axis 203a, 203b respectively. In FIG. 2A, the optical axis 203a, 203b extend along the z-direction. The optical structures 204a, 204b are light reflectors having a substantially elliptical sphere-shaped reflecting surface. The first and second optical structures 204a, 204b may be reflectors of other suitable shapes. Alternatively, optical lenses may be used in place of the reflectors to achieve desired to light patterns.

In some embodiment, the first light source 202a is positioned on the optical axis 203a, for example on a focal point 205a of the first optical structure 204a. The second light source 202b is positioned on the optical axis 203b, for example on a focal point 205b of the second optical structure 204b. In some embodiments, the first optical structure 204a and the second optical structure 204b are identical. The first light source 202a and the second light source 202b are different. The first light source 202a and the second light source 202b may be selectively activated to generate different lighting patterns.

In some embodiments, the vehicle lighting device 200 further includes a controller 210. The controller 210 is connected to the light source assembly 202 and configured to switch on and off, and/or adjust intensity of the light beam. In some embodiments, the controller 210 is connected to and control the first light source 202a and the second light source 202b individually. The controller 210 may include an adaptor to connect with a vehicle, for example to receive power supply and control signals from the vehicle.

In some embodiments, the vehicle lighting device 200 further includes a sensor assembly 212. The sensor assembly 212 is connected to the controller 210. The controller 210 may receive and process measurements from the sensor assembly 212 to control the light source assembly 202 accordingly. The sensor assembly 212 may include one or more suitable sensors configured to detect vehicle status and/or driving conditions associated with functions of vehicle lighting device 100. For example, the sensor assembly 212 may include one or more sensors for detecting vehicle speed, acceleration, vehicle steering angle (turning), light penetrating condition (fog), or other conditions. In some embodiments, the sensor assembly 212 may be integrated in the vehicle lighting device 200. Alternatively, the sensor assembly 212 may be positioned on different locations on a vehicle as an add-on sensor or an existing sensor in the vehicle. For example, the sensor assembly 212 may include GPS (global positioning system) sensors on board the vehicle.

FIGS. 2B and 2C schematically illustrate LED chips for the first light source 202a and second light source 202b according to some embodiments. The light sources 202a, 202b may be LED chips including a base 220a, 220b having an illumination area 222a, 222b mounted on the base 220a, 220b. The base 220a, 220b may be a substrate including routing circuits and heat sinks. The LED chips are configured to emit a light beam from the illumination area 222a, 222b. In FIGS. 2B and 2C, the illumination areas 222a, 222b are shaped in squares. However, the illumination areas 222a, 222b may be in other shapes, such as rectangular and circular. The illumination areas 222a, 222b are of different sizes. In some embodiments, the size of the illumination areas 222a, 222b may in a range between about 0.4 mm$^2$ and 25 mm$^2$. The first and second light sources 202a, 202b may be different in other properties, such as power level, and color of the light beam.

In FIGS. 2B and 2C, the first and second light sources 202a, 202b are single LED chips with a singular lighting area. Alternative, the first and second light sources 202a, 202b include two or more LED chips fixedly arranged to form an illumination area.

Referring back to FIG. 2A, when assembled, the illumination area 222a may be positioned on the focal point of the first optical structure 204a. Particularly, the illumination area 222a is positioned on the focal point 205a on the optical axis 203a, centered about the optical axis 203a, and substantially perpendicular to the optical axis 203a. Similarly, the illumination area 222b is positioned on the focal point 205b on the optical axis 203b, centered about the optical axis 203b, and substantially perpendicular to the optical axis 203b.

Figure 2D:
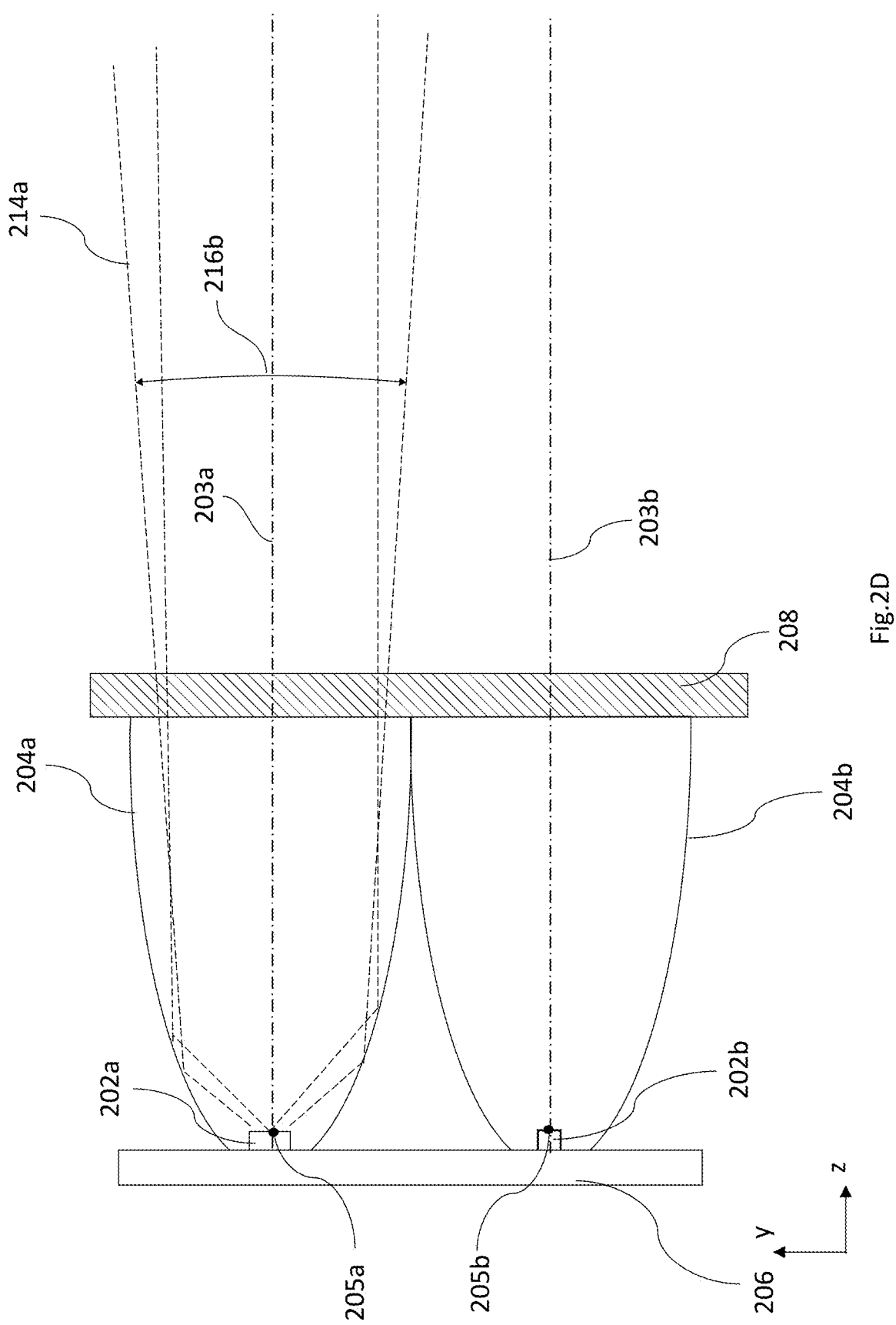

In the example of FIG. 2A, the first and second optical structures 204a, 204b are substantially identical and the illumination area 222a is greater than the illumination area 222b. FIGS. 2D and 2E schematically illustrate different lighting patterns generated by the first light source 202a and the second light source 202b. In FIG. 2D, the first light source 202a is on while the second light source 202b is off. A light beam 214a is generated from the illumination area 222a, reflected by the first optical structure 204a and projected along the focal axis 203a of the first optical structure 204a. The light beam 214a has a beam angle of 216a. In FIG. 2E, the first light source 202a is off while the second light source 202b is on. A light beam 214b is generated from the illumination area 222b, reflected by the second optical structure 204b and projected along the focal axis 203b of the second optical structure 204b. The light beam 214b has a beam angle of 216b. Because the illumination area 222a is larger than the illumination area 222b, the projection angle 216a is greater than the projection angel 216b. If the first and second light source 202a, 202b have the same power level, at the same distance from the light device 200, the light beam 214b is more focused and with a higher intensity than the light beam 214a, and the light beam 214a illuminates a larger area than the light beam 214b.

By selecting light sources with different illumination area sizes, power levels, or color ways, the optical structures 204a, 204b can produce various lighting patterns. When the optical structures 204a, 204b and the positioning of the light sources 202a, 202b remain the unchanged, width of the lighting pattern may be increased by increasing the size of the illumination area 222a, 222b, and depth of the lighting pattern may be increased by reducing the size of the illumination area 222a, 222b.

The light source assembly 202 may include any suitable lights. In some embodiments, the first light source 202a, selected to have a lower power level and larger illumination area 222a, is used to generate a lighting pattern for driving, or a low beam pattern. The beam angle 216a is up to 20°. The second light source 202b, selected to have a high-power level and smaller illumination area 222b, is used to generate a lighting pattern for a spot light, or a high beam pattern. The beam angle 216a is about 1.5°. The first light source 202a, and the second light source 202b may be turned on alternatively to generate a low beam pattern and a high beam pattern alternatively.

In some embodiments, the second light source 202b, may be used to generate an auxiliary pattern to enhance illumination in certain situations, for example when driving through dark surrounding, or at a high speed. As an auxiliary lighting, the second light source 202b is turned on intermittently with a less cooling demanding, thus, may be selected to have a high-power level.

In some embodiments, the light source assembly 202 include LED (light emitting diode) light source. Particularly, the first light source 202a and the second light source 202b are LED lights. As discussed above, the first light source 202a and the second light source 202b are different from each other. The first light source 202a and the second light source 202b are LED chips with having different illumination areas.

In some embodiments, the vehicle lighting device 200 is a vehicle headlamp. The first and second optical structures 204a, 204b may be designed to project forward driving beam patterns, such as the low beam pattern 110, the high beam pattern 130, or other beam patterns from a vehicle headlamp.

As discussed above, the vehicle light device 200 generates different lighting patterns by selectively projecting combination of different light sources through the same optical assembly. The light sources and the optical assemblies are stationary to each other without needing any moving components to adjust relative positions of the light source and the optical structure, thus, improving performance and flexibility at a low cost.

FIGS. 3A-3D are various schematic views of a vehicle lighting device 300 according to another embodiment of the present disclosure. The vehicle lighting device 300 includes a housing 302, a front frame 304, a transparent cover 306 (may include projector lens), a decorative bezel 308, a protective cover 310 to prevent dust and impact. In some embodiment, the transparent cover 306 may be project lens including optical features 326. A printed circuit board (PCB) 314 may include LED chips 324, and drive circuit and/or control circuit thereof. An optic assembly 318 including four cup reflectors 318a/318b/318c/318d are disposed in front of the LED chips 324 to generate lighting pattern for each LED chip 324. A bracket 316 may be positioned to support the optic assembly 318. A bracket 312 may be used to mount the lighting device 300 on to a vehicle.

In some embodiments, the vehicle lighting device 300 is a vehicle headlamp. One or more of the cup reflectors 318a/318b/318c/318d may be designed to project forward driving beam patterns, such as the low beam pattern 110, the high beam pattern 130, or other beam patterns from a vehicle headlamp.

FIGS. 3E-3H illustrate different arrangement of light sources for use in the vehicle light device of FIG. 3A-3D.

Figure 3A:
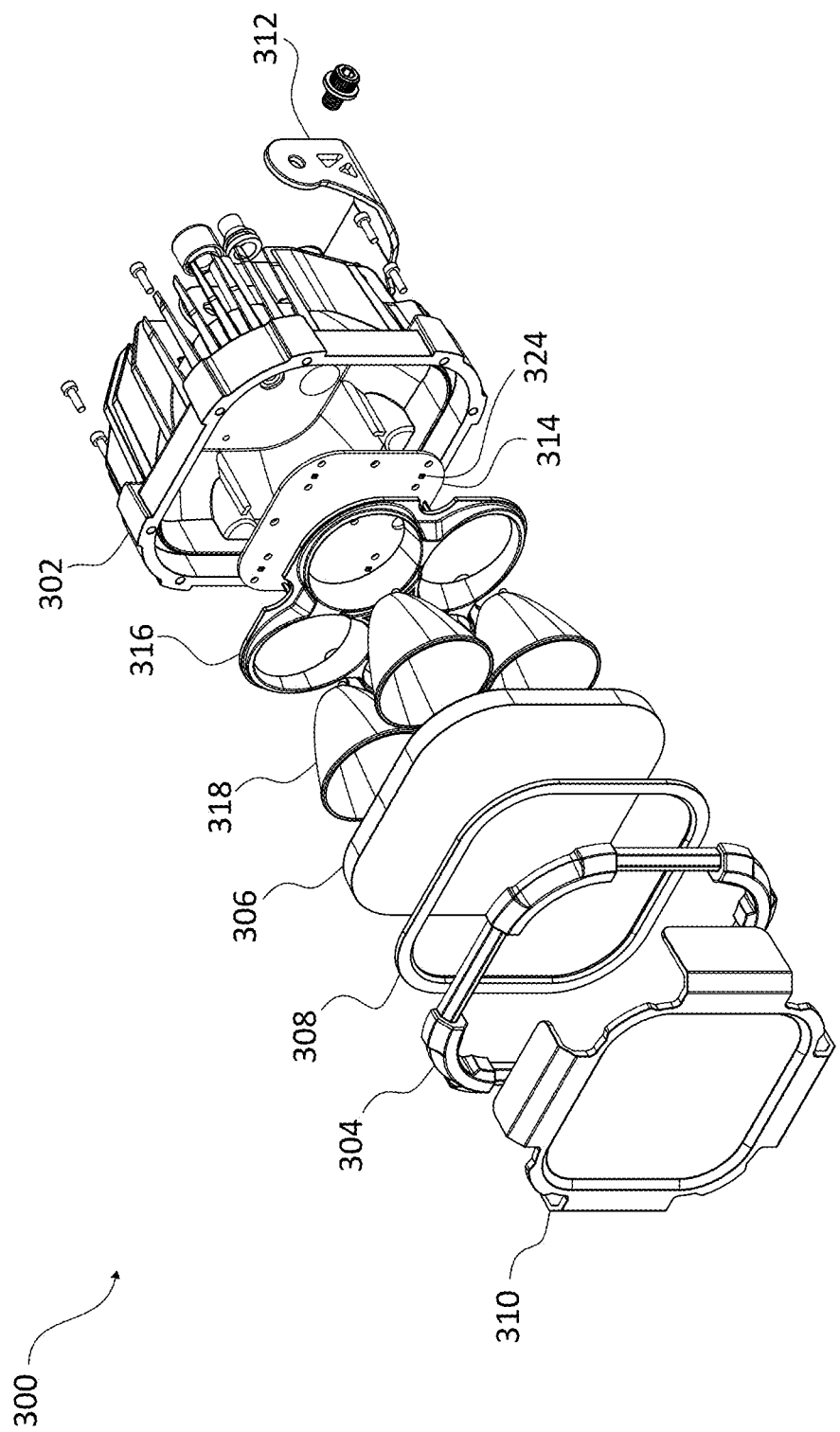
Figure 3B:
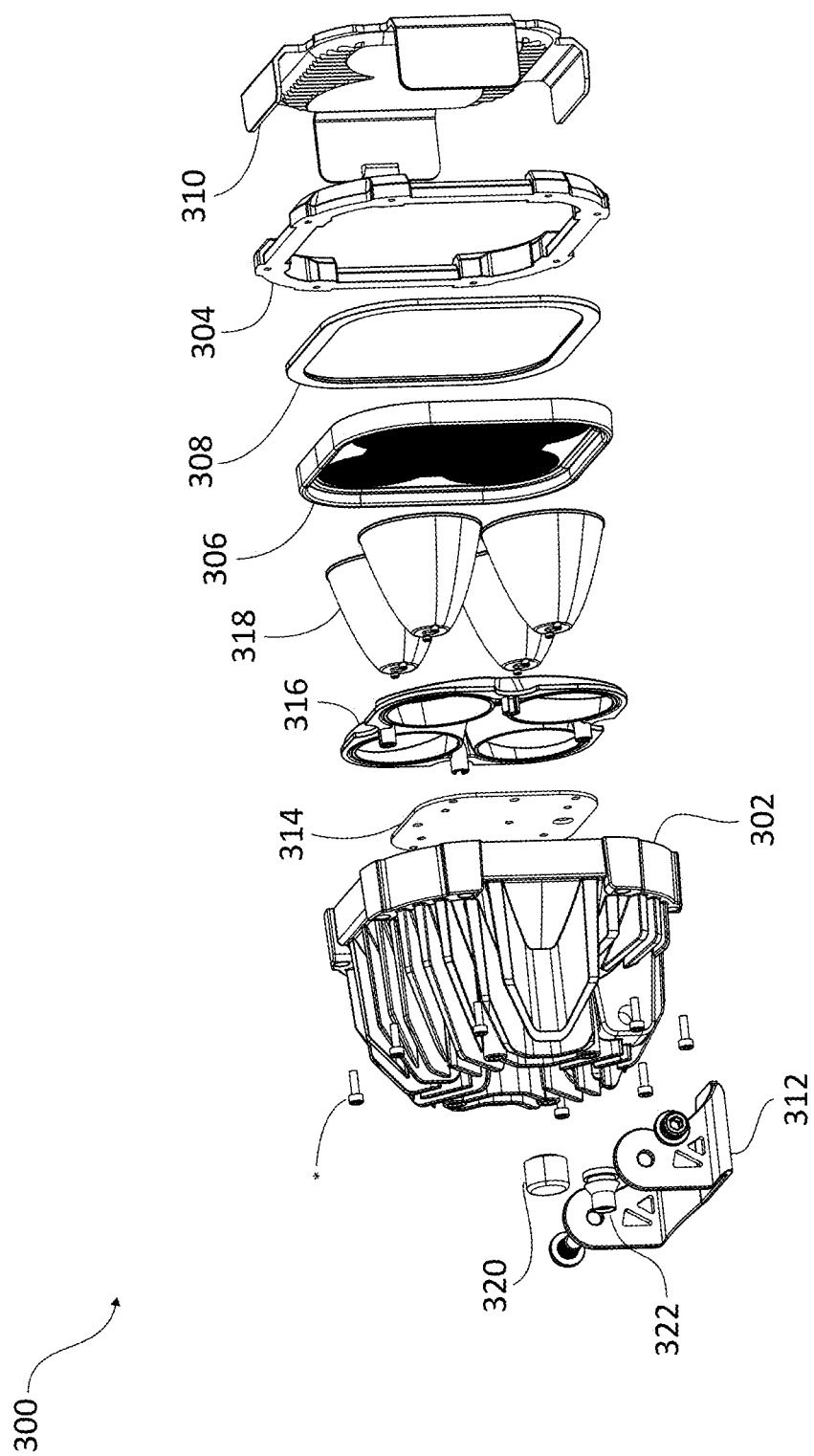
Figure 3C:
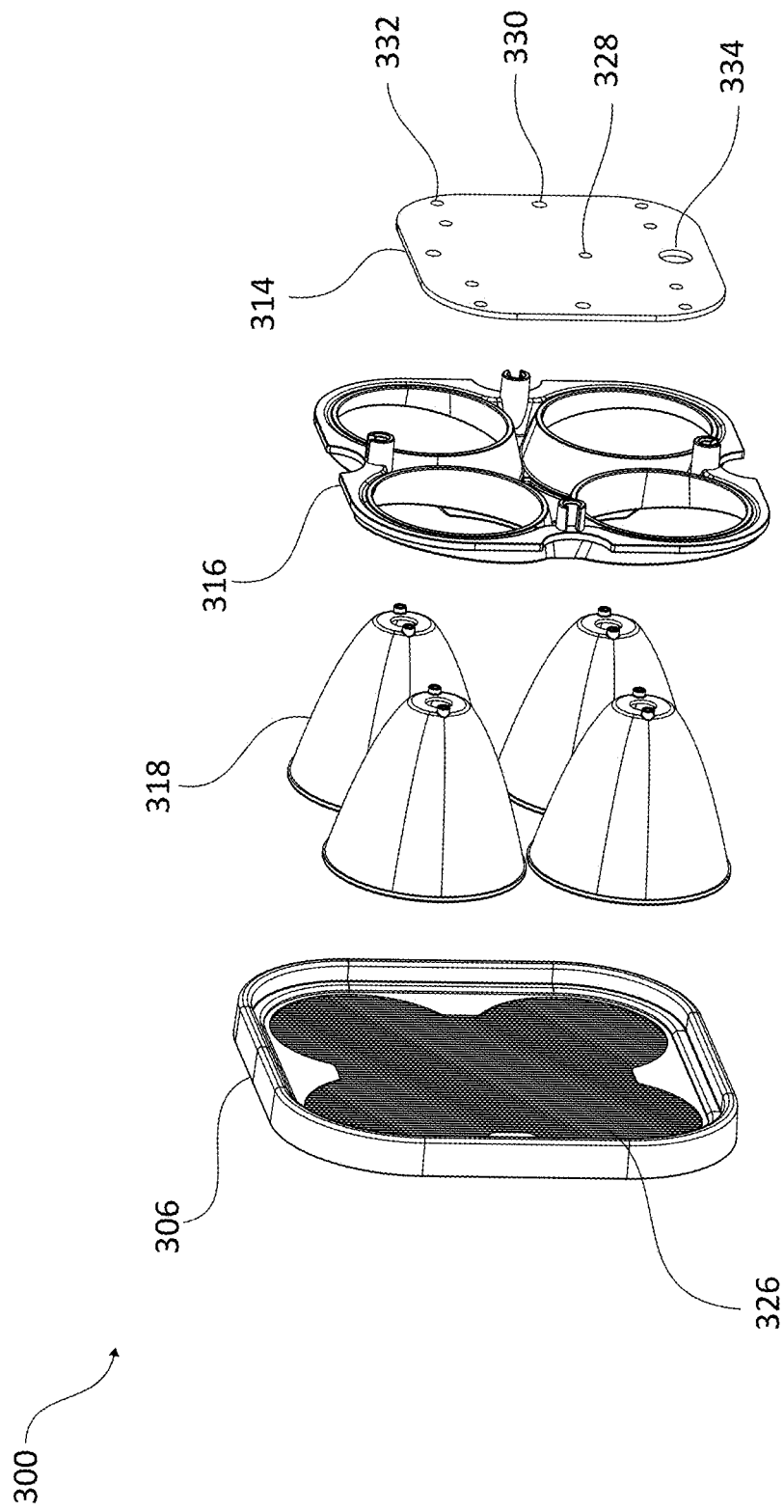
Figure 3F:
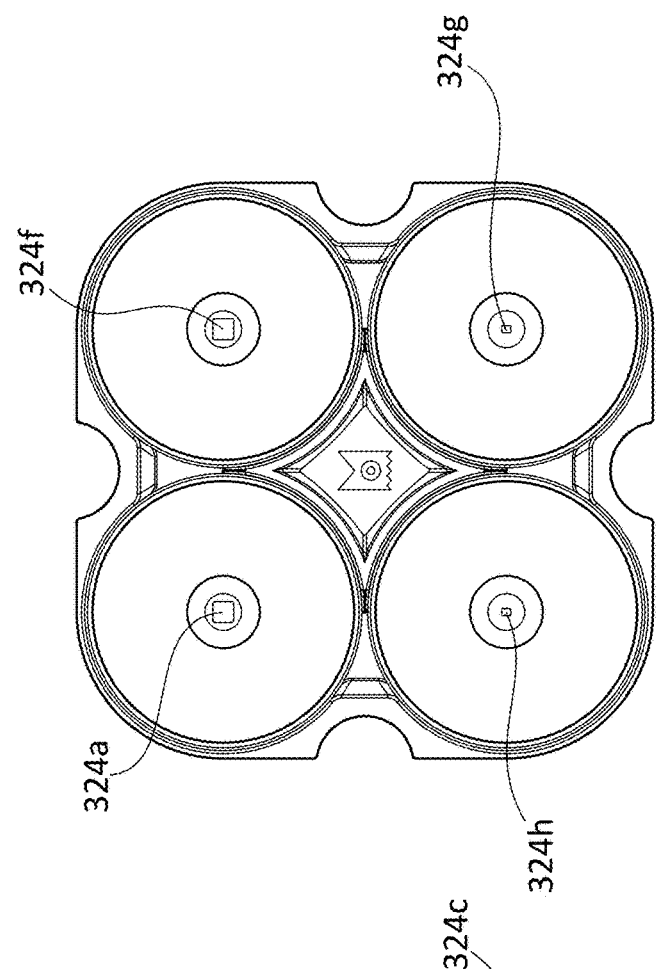
FIGS. 3E-3H illustrate different arrangement of light sources for use in the vehicle light device of FIG. 3A-3D.
Figure 3E:
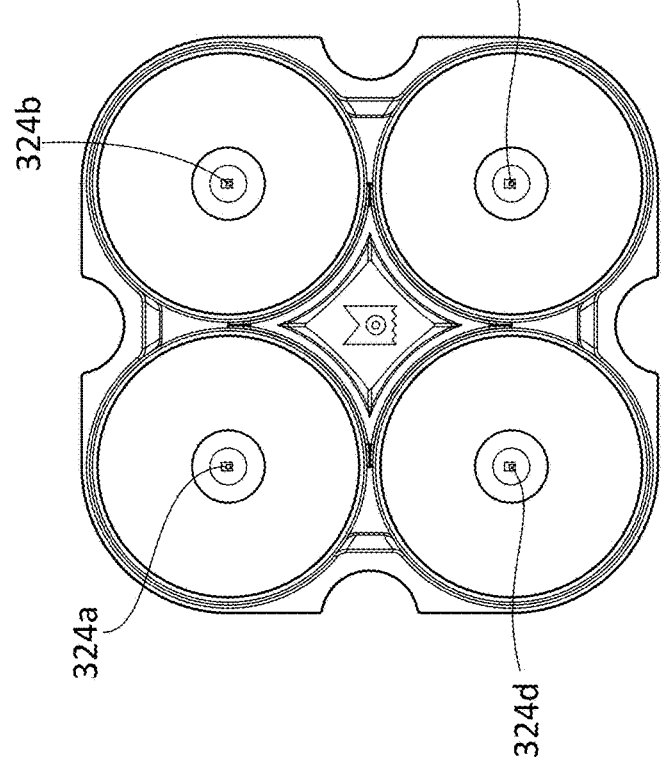

In FIG. 3E, LED chips 324a-d are all the identical. In some embodiments, the LED chips 324a-d may be selected according to the brightness needed. In FIG. 3E, the LED chips 324a-d are all the identical small chips. For example, the LED chips 324a-d may be LED chips sized of 0.7 mm×0.7 mm to operate at an energy level up to 1.5 W each, sized of 3.0 mm×3.0 mm to operate at an energy level up to 7.5 W each.

Figure 3H:
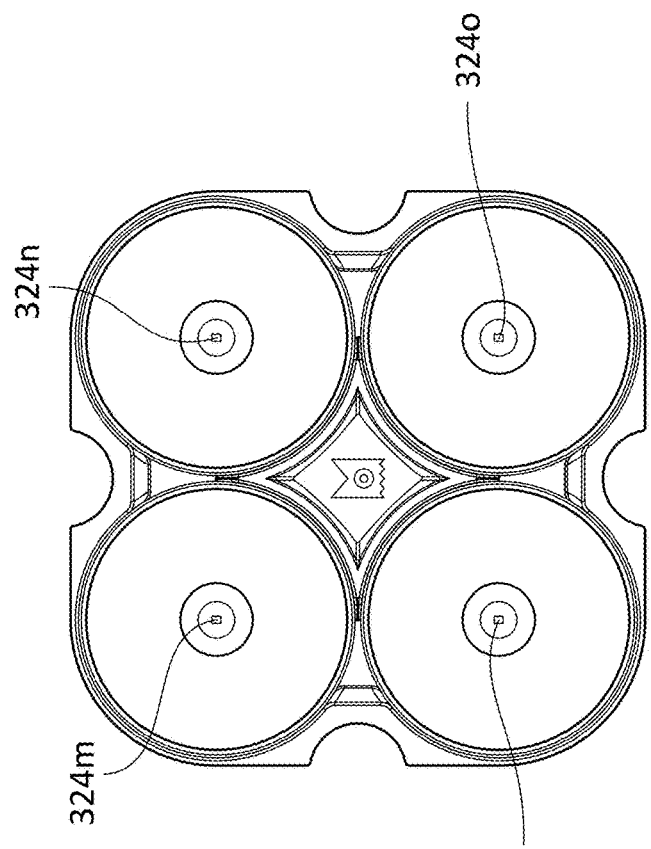
Figure 3G:
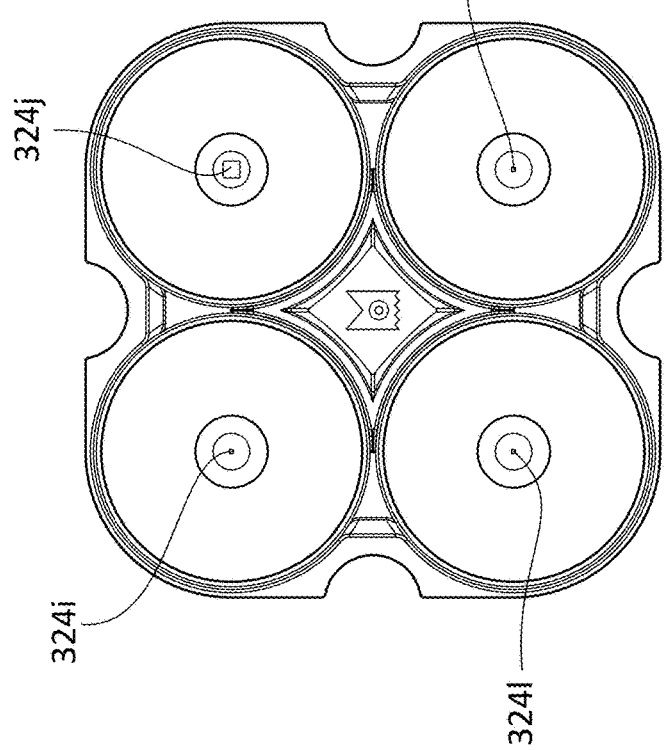

In FIG. 3F, LED chips 324e, 324f are larger, hence brighter than LED chips 324h, 324g. In FIG. 3G, LED chips 324i, 324l, 324k are smaller than an LED chips 324j. In FIG. 3H, LED chips 324m-p are all the identical large LED chips. In some embodiments, the LED chips 324m-p may be sized of 3.7 mm×3.7 mm to operate at an energy level up to 20 W each.

Figures 4A, 4B:
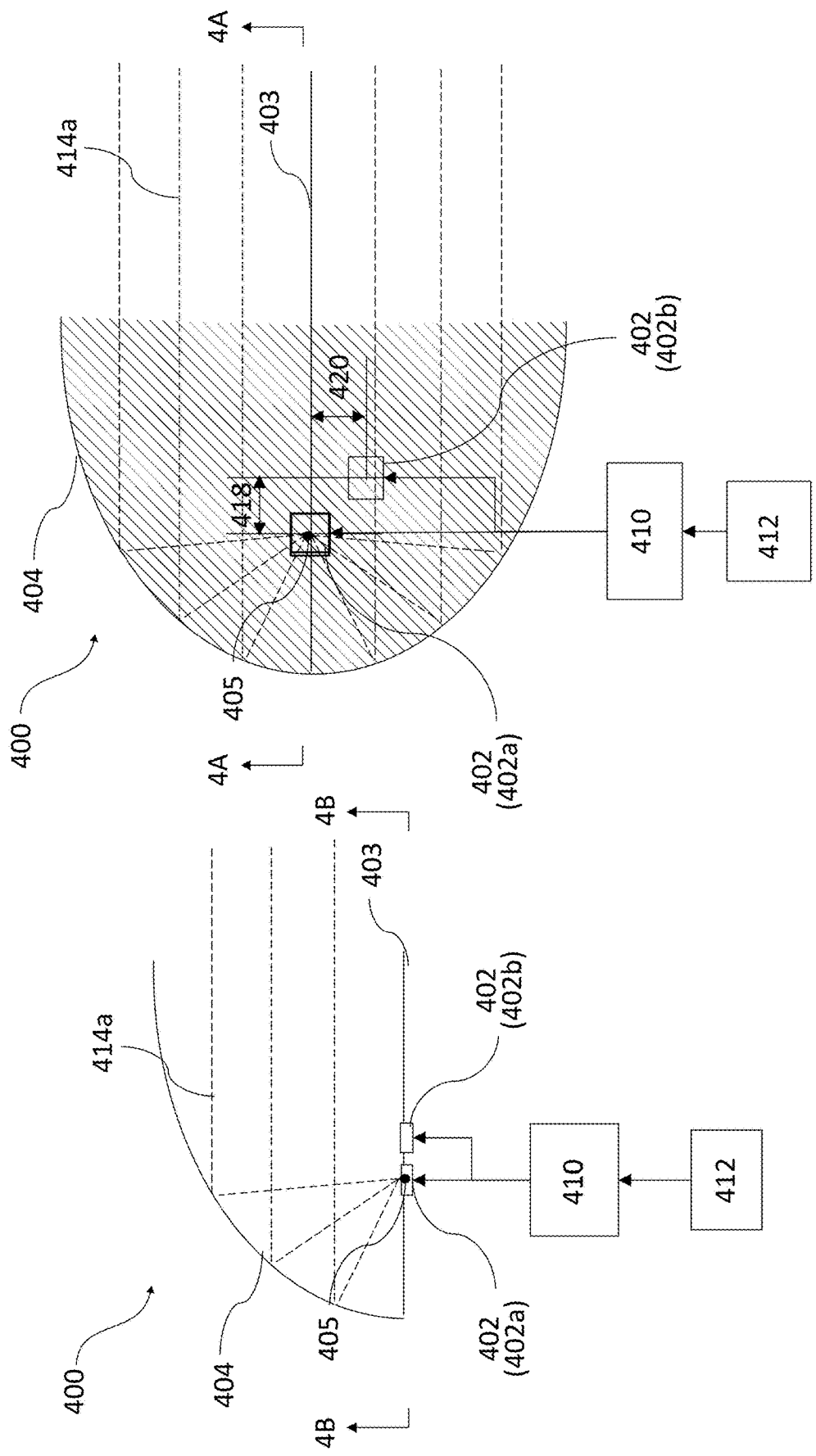

FIGS. 4A-4B are schematic views of a vehicle lighting device 400 according to one embodiment of the present disclosure. The vehicle lighting device 400 is configured to generate two or more lighting patterns using a first light source disposed on a focal point and a second light source disposed away from the focal point. FIGS. 4A and 4B are schematical sectional views of the vehicle light device 400. The vehicle lighting device 400 may include a light source assembly 402 and an optical structure 404 configured to project light beams from the light source assembly 402 to two or more illumination patterns. In the example of FIG. 4A, the optical structure 404 is a light reflector in a half cup shape, disposed over the x-z plane. The optical structure 404 has a focus axis 403 along the z-axis. The optical structure 404 has a focal point 405 on the focal axis 403. The light source assembly 402 is positioned to direct light beams toward the optical structure 404, which reflects and projects the light beams substantially along the z-axis, or the focal axis 403. The light source assembly 402 is positioned adjacent the focal point 405.

In some embodiment, the light source assembly 402 includes a first light source 402a, and a second light source 402b. The first light source 402a is positioned on the focal point 405, on the x-z plane. The second light source 402b is also positioned at a distance away from the focal point 405. The first and second light sources 402a, 402b may be LED chips, similar to the LED chips of FIGS. 2B and 2C. The first light source 402a is positioned so that the illumination area of the LED chip is on the x-z plane and centered about the focal point 405. The second light source 402b may be positioned so that the illumination area on the x-z plane, away from the focal point 405. As shown in FIG. 4B, the second light source 402b may be positioned at a distance 418 away from the focal point 405 along the z direction, and at a distance 420 away from the focal point 405 along the x direction. The distances 418 and 420 may be selected according to the design of the optical structure 404 and the desired lighting pattern from the second light source 402b. In some embodiments, the second light source 402b may be positioned to generate a light pattern, such as the fog beam pattern 120, or signal lights.

Even though two light sources are shown in the light source assembly 402, additional light source components, such as additional LED chips, or laser chips, may be added to achieve desired lighting patterns.

The first light source 402a and second light source 402b are fixedly positioned relative to the optical structure 404. Different light patterns may be achieved by switch on and off components of the light source assembly 402 at different combinations. The vehicle light device 400 further includes a controller 410 configured to control the light source assembly 402. In some embodiments, the controller 410 is connected to and control the first light source 402a and the second light source 402b individually. The controller 410 may include an adaptor to connect with a vehicle, for example to receive power supply and control signals from the vehicle.

In some embodiments, the vehicle lighting device 400 further includes a sensor assembly 412. The sensor assembly 412 is connected to the controller 410. The controller 410 may receive and process measurements from the sensor assembly 412 to control the light source assembly 402 accordingly. The sensor assembly 412 may be similar to the sensor assembly 212 described with the vehicle light device 200.

FIGS. 4A and 4B schematically demonstrate light path of the first light source 402a. Because the first light source 402a is disposed at the focal point 405, a light beam 414a from the first light source 402a is projected by the optical structure 404 in a focus manner along the focal axis 403.

FIGS. 4C and 4D schematically demonstrate light path of the second light source 402b. Because the first light source 402b is disposed off focus, i.e. at a location away from focal point 405, a light beam 414b from the second light source 402b is projected by the optical structure 404 in a more scattered manner.

In some embodiments, the vehicle lighting device 400 is a vehicle headlamp. The optical structure 404 may be designed to project at least one forward driving beam patterns, such as the low beam pattern 110, the high beam pattern 130, or other beam patterns from a vehicle headlamp. For example, the optical structure 404 may be designed to generate a first forward driving beam pattern from illumination of the light source 402a disposed on the focal point 405, and a second forward driving beaming pattern from illumination of the second light source 402b disposed at a distance away from the focal point 405. At least one of the first and second forward driving beam patterns meets a government standard. For example, the first forward driving beam pattern may be a low beam pattern, such as the low beam pattern 110, and second forward driving beam pattern may be a fog driving pattern, such as the fog beam pattern 120, which has a wider distribution area and a higher lighting profile.

It should be noted that the light sources 402*a* and 402*b* may be on at the same time, and a lighting pattern includes focused and scattered beams may be generated. By selecting light sources with different illumination area sizes, power levels, or color ways, and positioning the light sources at different locations, the optical structure 404 can produce various lighting patterns, therefore achieving dual-function or multi-function at a much lower cost compared to conventional technology.

Figure 5A:
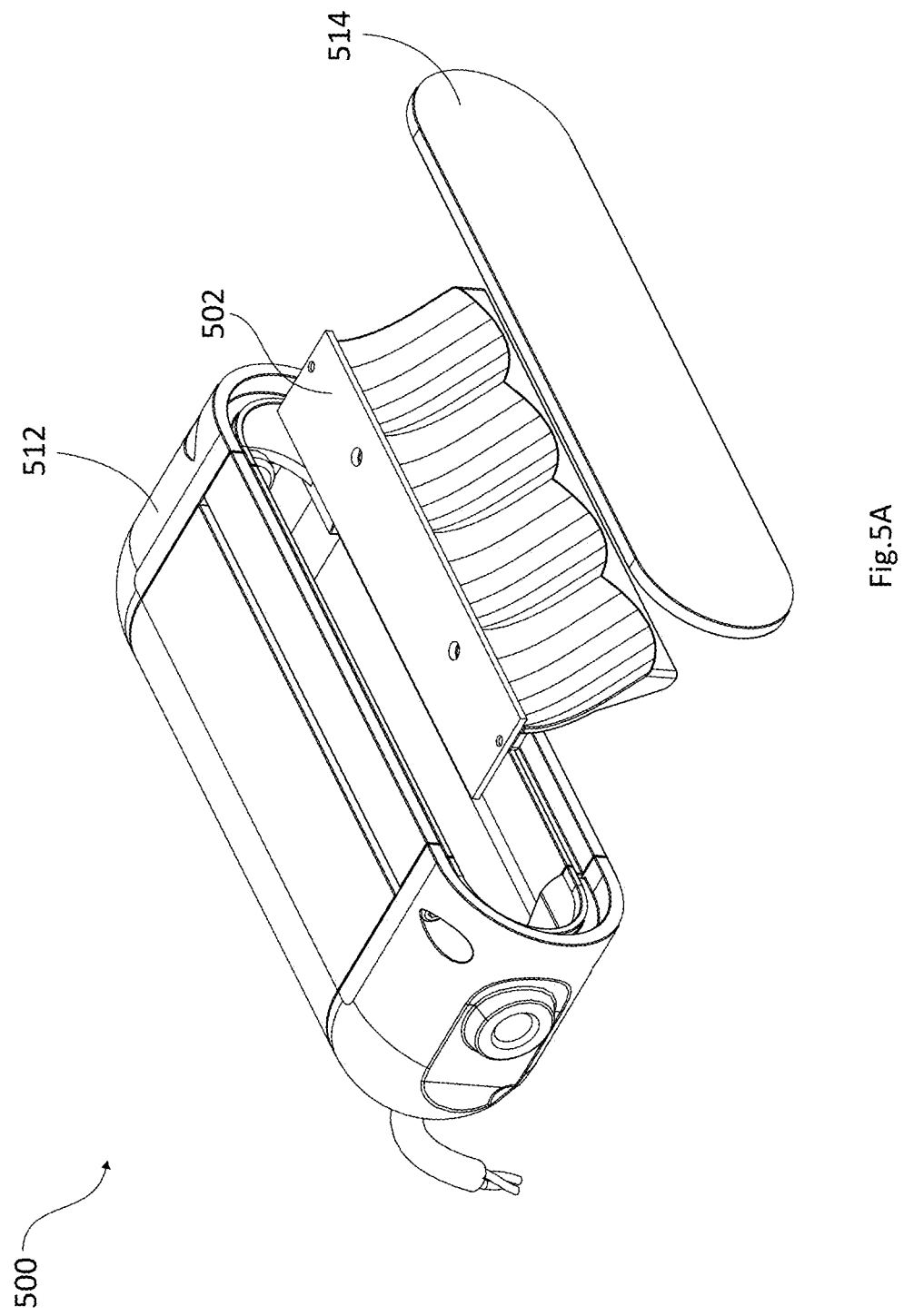
FIGS. 5A-5D are various schematic views of a vehicle lighting device according to another embodiment of the present disclosure.
Figure 5B:
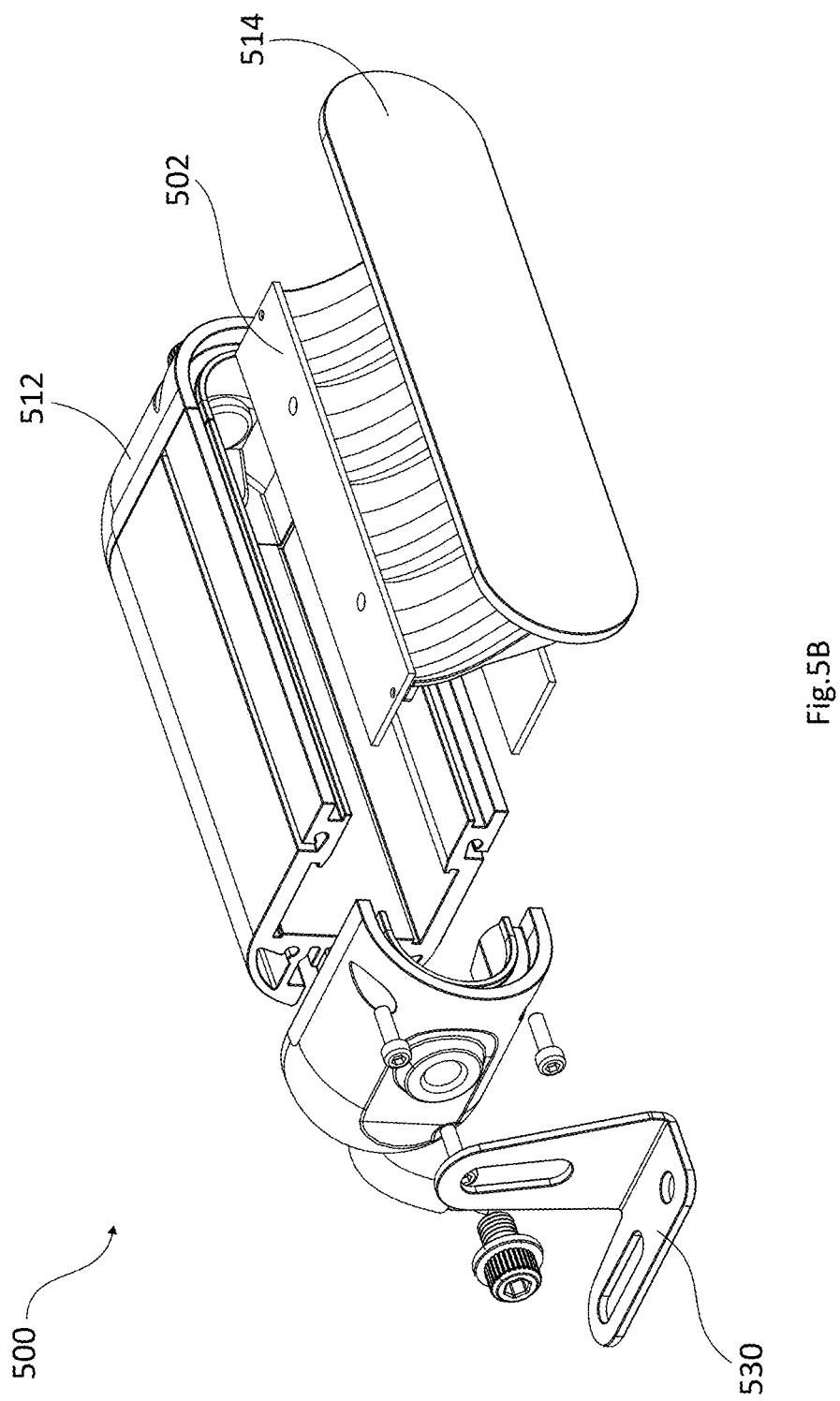
Figure 5C:
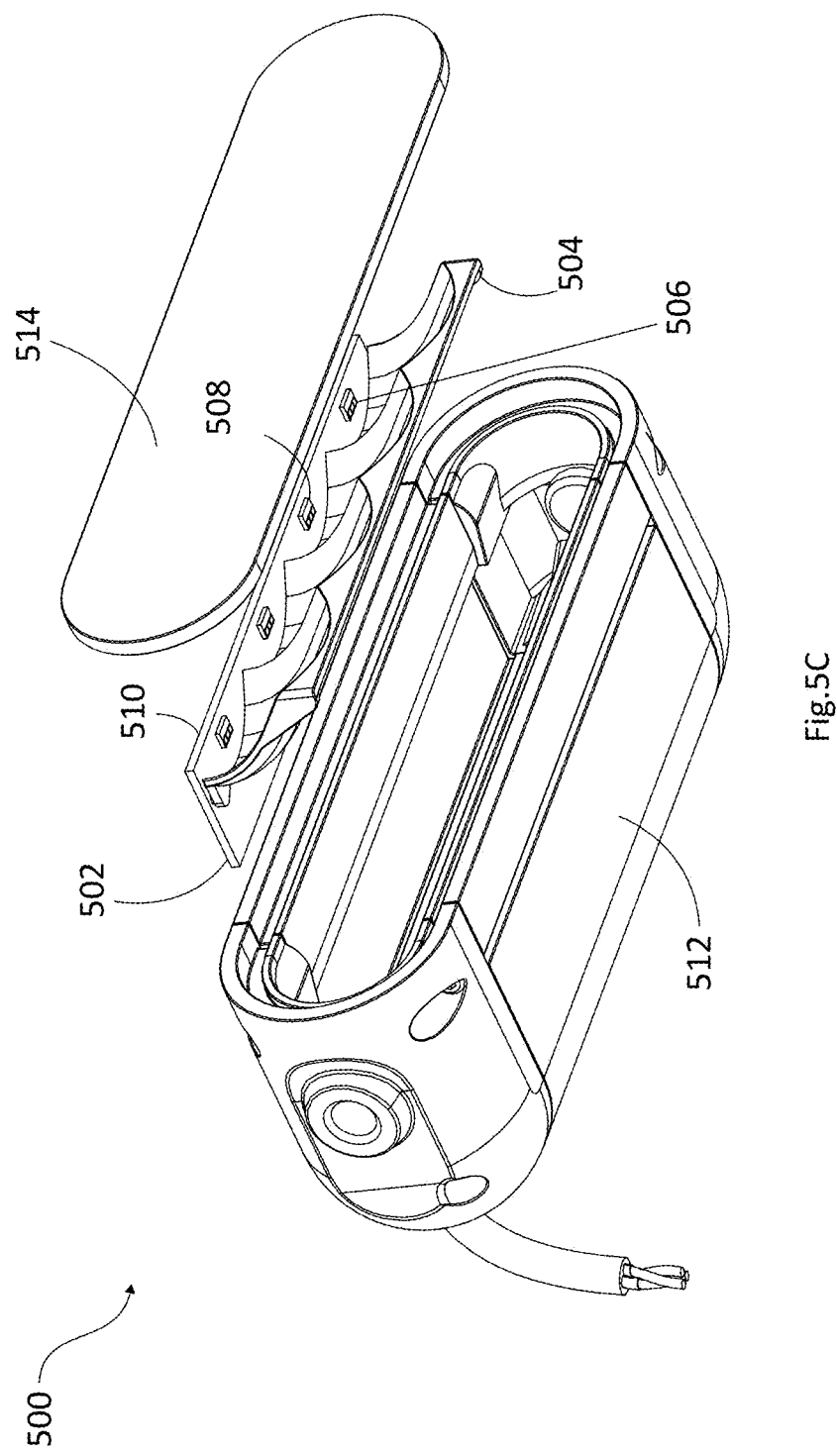

FIGS. 5A-5D are various schematic views of a vehicle lighting device 500 according to the present disclosure. Similar to the vehicle lighting device 400, the vehicle lighting device 500 includes one or more light sources positioned off-focus, or at a distance away from the focal point of an optical device. FIGS. 5A-5C are exploded views of the vehicle lighting device 500. The vehicle lighting device 500 includes a shell 512, a transparent cover 514 attached to the shell 512, and a light assembly 502 disposed in the shell 512 to project two or more lighting patterns through the transparent cover 514.

Figure 5D:
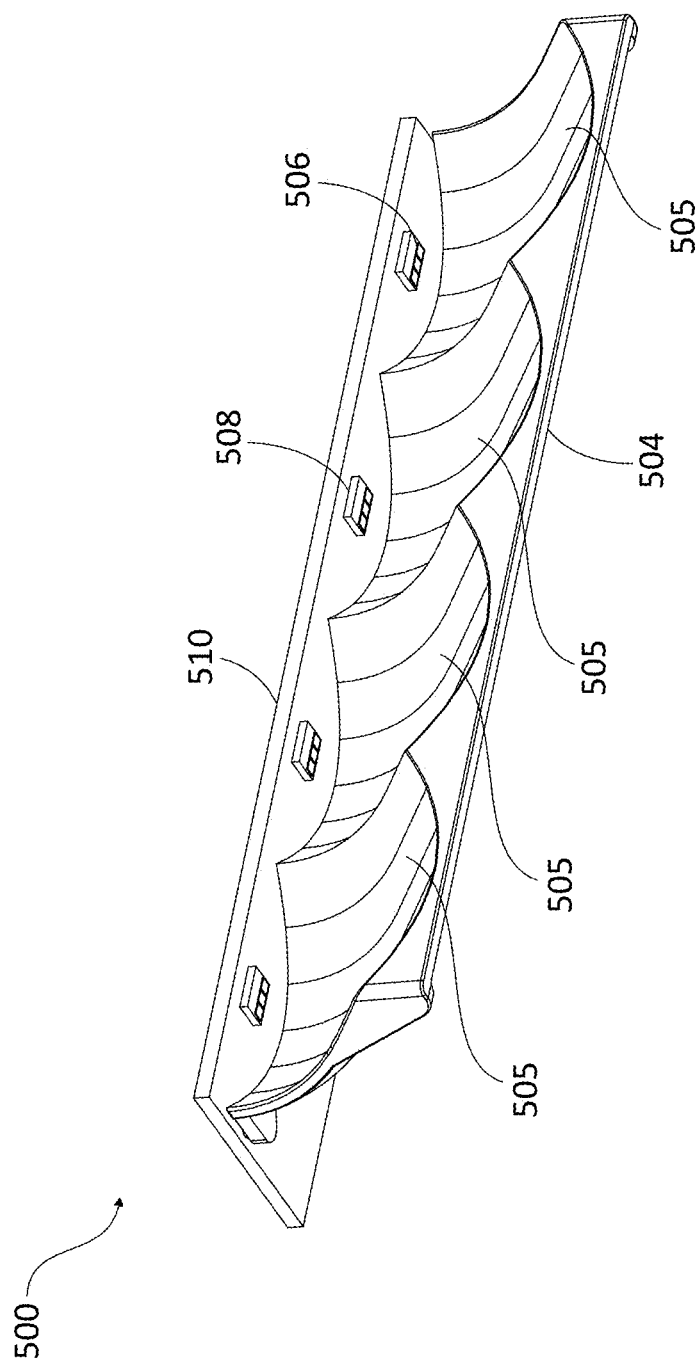

FIG. 5D is a perspective view of the light assembly 502. In some embodiments, the light assembly 502 includes LED lights. For example, the light assembly 502 includes one or more LED chipsets 508, an optical structure 504, and a PCB (printed circuit board) 510. In some embodiments, the optical structure 504 may be fixedly mounted on the PCB 510. The one or more LED chipsets 508 are arranged on the PCB 510, which may include control circuits to the one or more LED chipsets 508. Each LED chipset 508 may include two or more LED chips 506. The optical structure 504 may include two or more reflectors. The two or more LED chipsets 508 may be arranged to project lights towards the two or more reflectors. In some embodiments, each LED chipset 508 corresponds to one reflector. In some embodiments, the optical structure 504 includes two or more half cup shaped reflectors 505. In some embodiments, the optical structure 504 are designed to projecting a particular lighting pattern to meet various standards. For example, the optical structure 504 is designed to project a precise lighting patter, for example a low beam driving pattern, a high beam driving pattern, a spot light driving pattern, or the like, from a light source disposed on the focal point. Each LED chipset 508 is positioned adjacent to a focal point of each half cup shaped reflector 505. A mounting bracket 530 may be attached to the light assembly 502 to secure on a vehicle.

In some embodiments, the PCB 510 may include a light control unit configured to control the two or more LED chipsets 508. Different LED chips 506 may be included in each LED chipsets 508 to achieve desired lighting pattern. Each LED chip 506 may be similar to the LED chip 202*a*, 202*b* shown in FIGS. 2B and 2C. The light control unit may send signals to the LED chipsets 508 to selectively turn on different LED chips 506 to achieve desired lighting patterns. In some embodiments, the PCB 510 may include one or more sensors, or connect to one or more sensors, and generate control signals according to measurements of the one or more sensors, thus, achieving different lighting patterns with the two or more LED chipsets 508. The one or more sensors may include GPS sensor, accelerators, light sensors, LARDR, image sensors, infrared sensors, or any suitable sensors for measuring vehicle speed, sensing nearby objects, or other information needed for smart driving.

Each LED chipset 508 may include at least two LED chips 506. Each LED chip 506 is configured to output a light beam of a particular color and a particular color temperature. In some embodiments, the at least two LED chips 506 on each LED chipset 58 are configured to output different light beams from one another. For example, the LED chips 506 can output individually white, yellow and other color lightings. Depending on the types and arrangement of the LED chips 506 on the LED chipset 508, and the relative location of the LED chips 506 to the corresponding optical structure 504, such as the corresponding half cup shaped reflector 505.

In some embodiments, each LED chipset 508 is designed to achieve different lighting output by outputting white, yellow lights or other colors as provided by the LED chips 506. Two or more LED chips 506 in each LED chipset 508, and two or more LED chipsets 508 may be used to ensure that the vehicle lighting device 500 is an effective light source for driving in different environments and needs, and ensure driving safety. The light control unit can switch and light up different LED chips, and then control the output of different light patterns, different output modes, i.e. different output combinations such as continuous constant lighting, fast/slow burst lighting and alternate burst lighting, so as to reinforce the warning function and to ensure the effective transmission of warning signals. For example, the vehicle lighting device 500 may output white light for normal weather, yellow light for rainy and foggy weather, and red color or other colors within the chipsets for situations that require warning.

In some embodiments, the vehicle lighting device 500 is a vehicle headlamp. All or a portion of the half cup shaped reflectors 505 of the optical structure 504 may be designed to project at least one forward driving beam patterns, such as the low beam pattern 110, the high beam pattern 130, or other beam patterns from a vehicle headlamp. For example, all or a portion of the half cup shaped reflectors 505 may be designed to generate a first forward driving beam pattern from illumination of the light source disposed on the corresponding focal points, and a second forward driving beaming pattern from illumination of the light source disposed at a distance away from the corresponding focal points. At least one of the first and second forward driving beam patterns meets a government standard. For example, the first forward driving beam pattern may be a low beam pattern, such as the low beam pattern 110, and second forward driving beam pattern may be a fog driving pattern, such as the fog beam pattern 120, which has a wider distribution area and a lower lighting profile.

Compared to the current vehicle lighting devices, which typically output one type of lighting pattern, the vehicle light device 500 of the present disclosure can provide different lightings according to different road conditions and environment requirements.

Figure 5E:
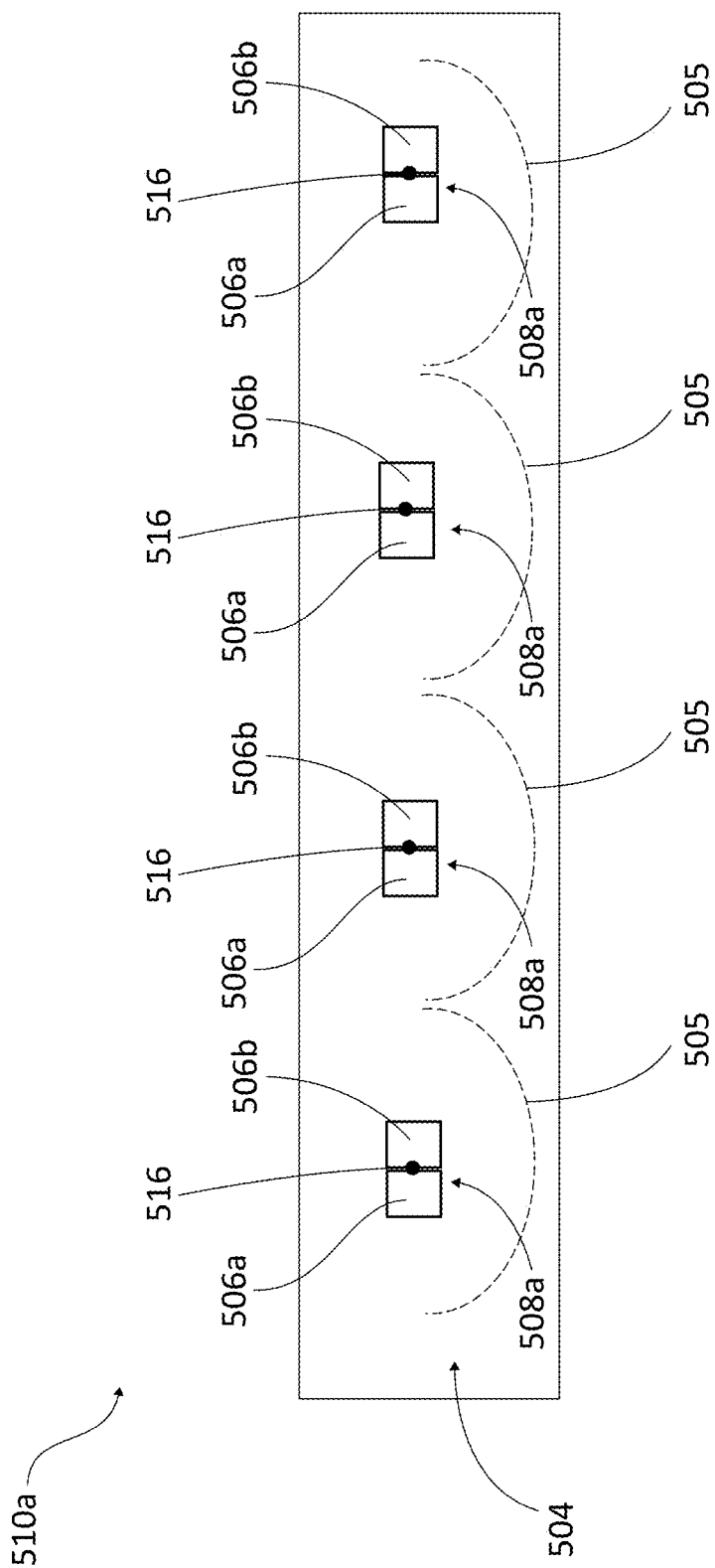
FIGS. 5E-5G illustrate different arrangement of light sources for use in the vehicle light device of FIG. 5A-5D.
Figure 5F:
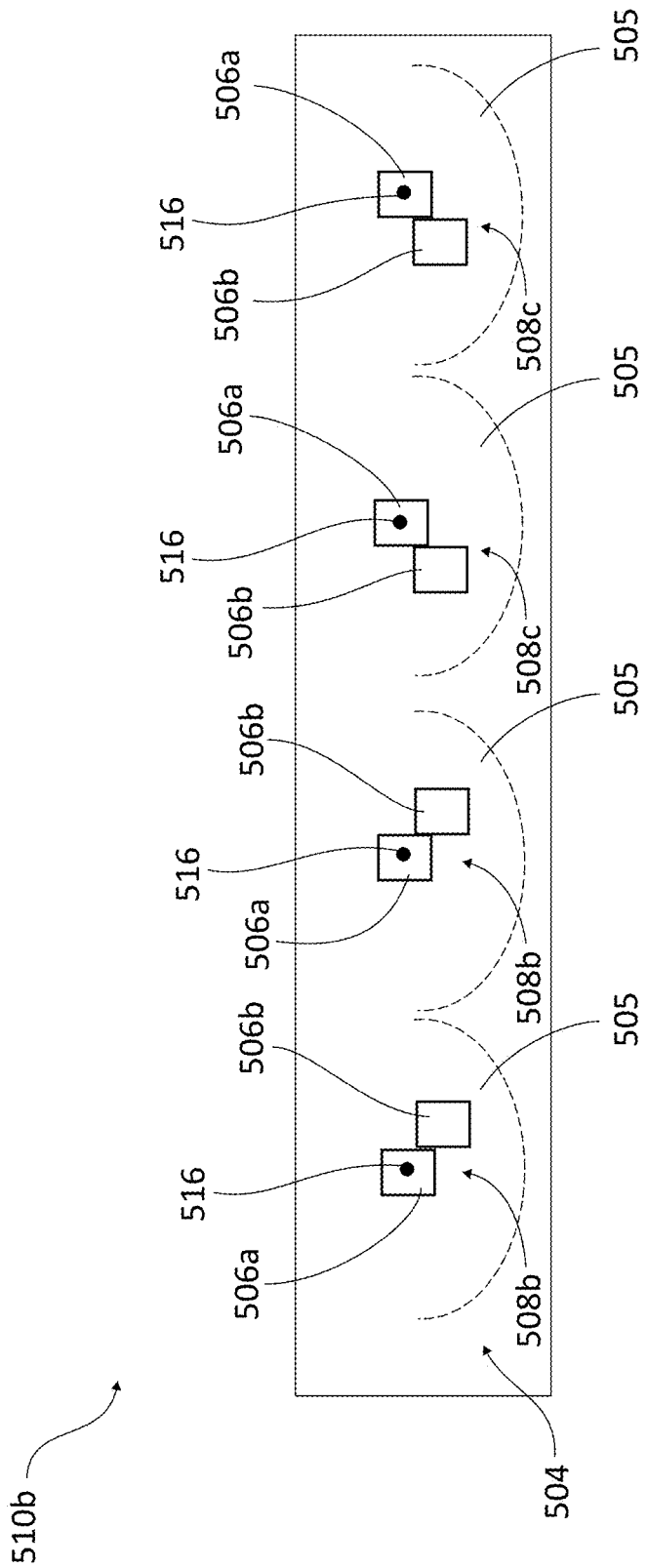
Figure 5G:
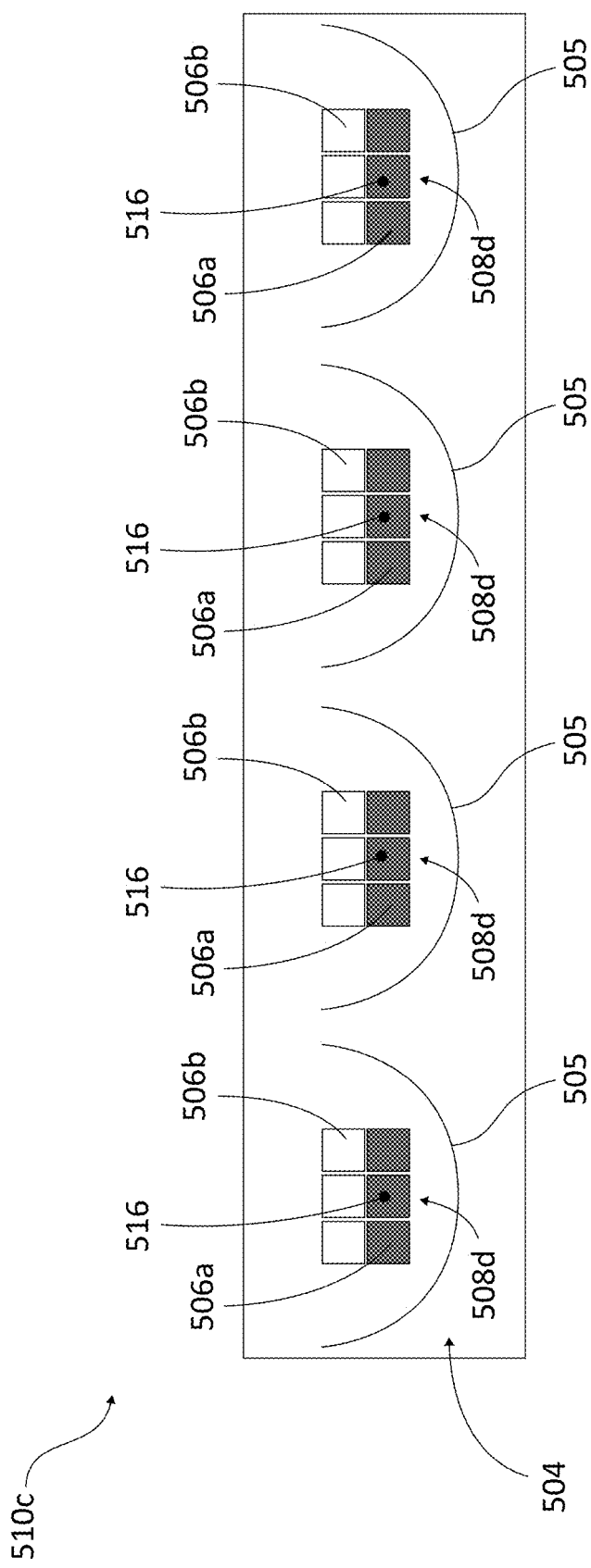

FIGS. 5E-5G illustrate different arrangement of PCBs with different LED chipsets for use in the vehicle light device 500 of FIG. 5A-5D.

FIG. 5E shows a PCB 510*a* according to one embodiment of the present disclosure. The PCB 510*a* may be used in place of the PCB 510 in the vehicle light device 500. Two or more chipsets 508*a* are arranged on the PCB 510*a*. Each chipset 508*a* includes a LED chip 506*a* and a LED chip 506*b*. In some embodiments, the LED chip 560*a* and the LED chip 506*b* are positioned immediately next to each other, for example immediately side by side. In some embodiments, the LED chips 506*a* and LED chips 506*b* are configured to provide vehicle lighting at different light output modes. For example, the LED chips 506*a* may be used to provide a driving pattern, for example a low beam driving pattern, a high beam driving pattern, a spot light driving pattern, or the like, and the chips LED 506b may be used as signal lights. In one embodiment, the LED chips 506a are configured to provide white light and the LED chips 506b are configured to provide yellow lights.

The PCB 510a is configured to assembled relative to an optical structure, such as the optical structure 504. In some embodiments, the chipsets 508a are positioned to align with focal points of the optical structure. For example, upon assembly, each chipset 508a is positioned on a focal point 516 of one the reflection cup 505 in the optical structure 504. The LED chips 508 may symmetrically positioned relative to the corresponding focal point 516 of the reflection cup 505. For example, the LED chip 506a and LED chip 506b in each chipset 508a are symmetrically arranged about the focal point 516 of the corresponding reflection cup 505. This arrangement allows the LED chips 506a and LED chips 506b to project substantially the same lighting pattern. The LED chips 506a and LED chips 506b may be turned on separately or at the same time to achieve desired lighting effects. In some embodiments, the vehicle light device 500 with the PCB 510a may be a fog light, a safety driving light.

FIG. 5F shows a PCB 510b according to one embodiment of the present disclosure. The PCB 510b may be used in place of the PCB 510 in the vehicle light device 500. Two or more chipsets 508b and two or more chip sets 508c are arranged on the PCB 510b. Each chipset 508b includes a LED chip 506a and LED chip 506b disposed at an offset position from the LED chip 506a. Each chipset 508c is a mirror image of the chipset 508b. The LED chip 506a in each chipset 508b, 508c is positioned to align with the focal point 516 of the reflection cup 505. While the LED chips 506b are positioned away from the focal points 516. In some embodiments, the LED chips 506a and LED chips 506b may be bright white light sources and are positioned on the focal points 516 of the optical structure 504 to project a precise lighting pattern, for example a low beam driving pattern, a high beam driving pattern, a spot light driving pattern, or the like. The LED chips 506b are positioned off focus to provide a scattered light, for example for project a fog light, or a signal light.

FIG. 5G shows a PCB 510c according to one embodiment of the present disclosure. The PCB 510c may be used in place of the PCB 510 in the vehicle light device 500. In some embodiments, two or more chipsets 508d are arranged on the PCB 510a. Each chipset 508d may include an array of LED chips. In some embodiments, each chipset 508d may include an array of LED chips 506a and an array of the LED chips 506b. In the example of FIG. 5G, each chipset 508d includes a row of the LED chips 506a and a row of the LED chips 506b. The LED chips 506a are arranged in a row immediately next to each other. Similarly, the LED chips 506b are arranged in a row immediately next to each other. The row of the LED chips 506a is positioned immediately next to the row of the LED chips 506b.

In some embodiments, the LED chips 506a and LED chips 506b are configured to provide vehicle lighting at different light output modes. For example, the LED chips 506a may be used as driving lights, such as auxiliary driving lights, and the chips LED 506b may be used as signal lights. In one embodiment, the LED chips 506a are configured to provide white light and the LED chips 506b are configured to provide yellow lights. It should be noted that the chipsets 508d may have any suitable arrangement to achieve desired function. For example, each chipset 508 may include more than two types of different LED chips to achieve more desired function. In FIG. 5G, three LED chips 506a/506b are included in each row. It should be noted, less or more LED chips 506a/506b may be included in each row.

The PCB 510c is configured to assembled relative to an optical structure, such as the optical structure 504. In some embodiments, the chipsets 508d are positioned to align with focal points of the optical structure. For example, upon assembly, each chipset 508d is positioned on the focal point 516 of one the reflection cup 505 in the optical structure 504. In FIG. 5G, the row of LED chips 506a is positioned on the focal point 516, i.e. the focal point 516 aligns with the center of the row of LED chips 506a. The row of LED chips 506b are positioned off focus. This arrangement allows the row of LED chips 506a to generate a precise pattern, for example a low beam driving pattern, a high beam driving pattern, a spot light driving pattern, or the like, and the row of LED chips 506b to generate scattered light pattern, such as work lights or signal lights. The row of LED chips 506a and the row of LED chips 506b may be turned on separately or at the same time to achieve desired lighting effects.

The arrangements shown in FIGS. 5E, 5F, 5G are only examples. Persons skilled in the art may modify the arrangements to achieve desirable design. In some embodiments, the arrangements shown in FIGS. 5E, 5F, 5G may be combined in one light assembly.

Some embodiments of the present disclosure provide a vehicle lamp assembly comprising: an optical assembly comprising two or more optical structures, wherein each of the two or more optical structure has a focal point and is configured to project a forward driving beam pattern from a light source positioned on the focal point; and a printed circuit board comprising two or more LED chipsets disposed thereon, wherein each of the two or more chipsets comprising: a first LED light source; and a second LED light source adjacent the first illumination area, wherein the printed circuit board is fixedly positioned relative to the optical assembly, and two or more chipsets are aligned with the two or more optical structures respectively.

Some embodiments of the present disclosure provide a vehicle lamp assembly, comprising: an optical structure having a focal point, wherein the optical structure is configured to project a first beam pattern and a second beam pattern, and the first beam pattern is a forward driving beam pattern; a first LED light source, wherein the first LED light source is disposed on the focal point of the optical structure to generate the first beam pattern through the optical structure; and a second LED light source, wherein the disposed adjacent the first LED light source and at a distance from the focal point to generate the second beam pattern through the optical structure.

Some embodiments of the present disclosure provide a vehicle lamp assembly, comprising: a first LED light source; a first optical structure positioned to receive and project light beams from the first LED light source; a second LED light source different from the first LED light source; and a second optical structure positioned to receive and project light beams from the second LED light source, wherein the first and second optical structures are identical.

In some embodiments, the first LED light source has a first illumination area, the second LED light source has a second illumination area, and the first illumination area is larger than the second illumination area.

In some embodiments, the first LED light source comprises one first LED chip and one second LED chip in a first arrangement, the second LED light source comprises a third LED chip and a fourth LED chip in a second arrangement, and the first arrangement are different from the second arrangement.

In some embodiments, the first LED chip in the first LED light source is disposed at a focal point of the first optical structure, and the third LED chip in the second LED light source is disposed at a focal point of the second optical structure.

In some embodiments, the first and second LED light sources are disposed on a printed circuit board, and the first and second optical structures are fixedly attached to the printed circuit board.

In some embodiments, the printed circuit board further comprising: a control circuit configured to selectively operating the first LED light source and the second light source.

While the foregoing is directed to embodiments of the present disclosure, other and further embodiments of the disclosure may be devised without departing from the basic scope thereof.

The invention claimed is:

1. A vehicle lamp assembly, comprising:
   a first LED light source;
   a first optical structure positioned to receive and project light beams from the first LED light source;
   a second LED light source; and
   a second optical structure positioned to receive and project light beams from the second LED light source,
   wherein the first optical structure and the second optical structure are identical, and the first LED light source and the second LED light source are different.

2. The vehicle lamp assembly of claim 1, wherein the first LED light source has a first illumination area, the second LED light source has a second illumination area, and the first illumination area is larger than the second illumination area.

3. The vehicle lamp assembly of claim 2, wherein the first LED light source comprises one first LED chip and one second LED chip in a first arrangement, the second LED light source comprises a third LED chip and a fourth LED chip in a second arrangement, and the first arrangement are different from the second arrangement.

4. The vehicle lamp assembly of claim 3, wherein the first LED chip and the second LED chip in the first LED light source are symmetrically arranged about focal point of the first optical structure.

5. The vehicle lamp assembly of claim 3, wherein the first LED chip and the second LED project different color lights.

6. The vehicle lamp assembly of claim 3, wherein the first LED chip in the first LED light source is disposed at a focal point of the first optical structure, and the third LED chip in the second LED light source is disposed at a focal point of the second optical structure.

7. The vehicle assembly of claim 6, wherein the second LED chip in the first LED light source is disposed at a first distance from the focal point of the first optical structure, and the fourth LED chip in the second LED light source is disposed at a second distance from the focal point of the second optical structure.

8. The vehicle lamp assembly of claim 2, wherein the first LED light source comprises a first base, the first illumination area is formed on the first base, and the first illumination area is operable to emit a light beam, and the second first LED light source comprises a second base, the second illumination area is formed on the second base, and the second illumination area is operable to emit a light beam.

9. The vehicle lamp assembly of claim 8, wherein each of the first base and the second base comprises a substrate having circuits and a heat sink.

10. The vehicle lamp assembly of claim 2, wherein the first illumination area is in a range between about 0.4 mm$^2$ and 25 mm$^2$.

11. The vehicle lamp assembly of claim 1, wherein the first and second LED light sources are disposed on a printed circuit board, and the first and second optical structures are fixedly attached to the printed circuit board.

12. The vehicle lamp assembly of claim 11, wherein the printed circuit board further comprising: a control circuit configured to selectively operating the first LED light source and the second LED light source.

13. The vehicle assembly of claim 11, wherein the first LED light source has a first illumination area having a first width, the second LED light source has a second illumination area having a second width, and the first width is greater than the second width.

14. The vehicle assembly of claim 13, wherein the second LED light source has a higher power level than the first LED light source.

15. The vehicle lamp assembly of claim 1, wherein the first LED light source and first optical structure generate a first beam pattern, the second LED source and the second optical structure generate a second beam pattern, and the first beam pattern and the second beam pattern are different.

16. The vehicle lamp assembly of claim 15, wherein the first LED light source is wider than the second LED light source, and the first beam pattern is wider than the second beam pattern.

17. The vehicle assembly of claim 1, wherein each of the first and second LED light sources comprises:
   a base including routing circuits; and
   an illumination area formed on the base, wherein the illumination area is operable to emitting a light beam.

18. The vehicle assembly of claim 17, wherein a width of the illumination area is selected to obtain a beam angle projected through the corresponding optical structure.

* * * * *